UNITED STATES PATENT OFFICE 2,605,379

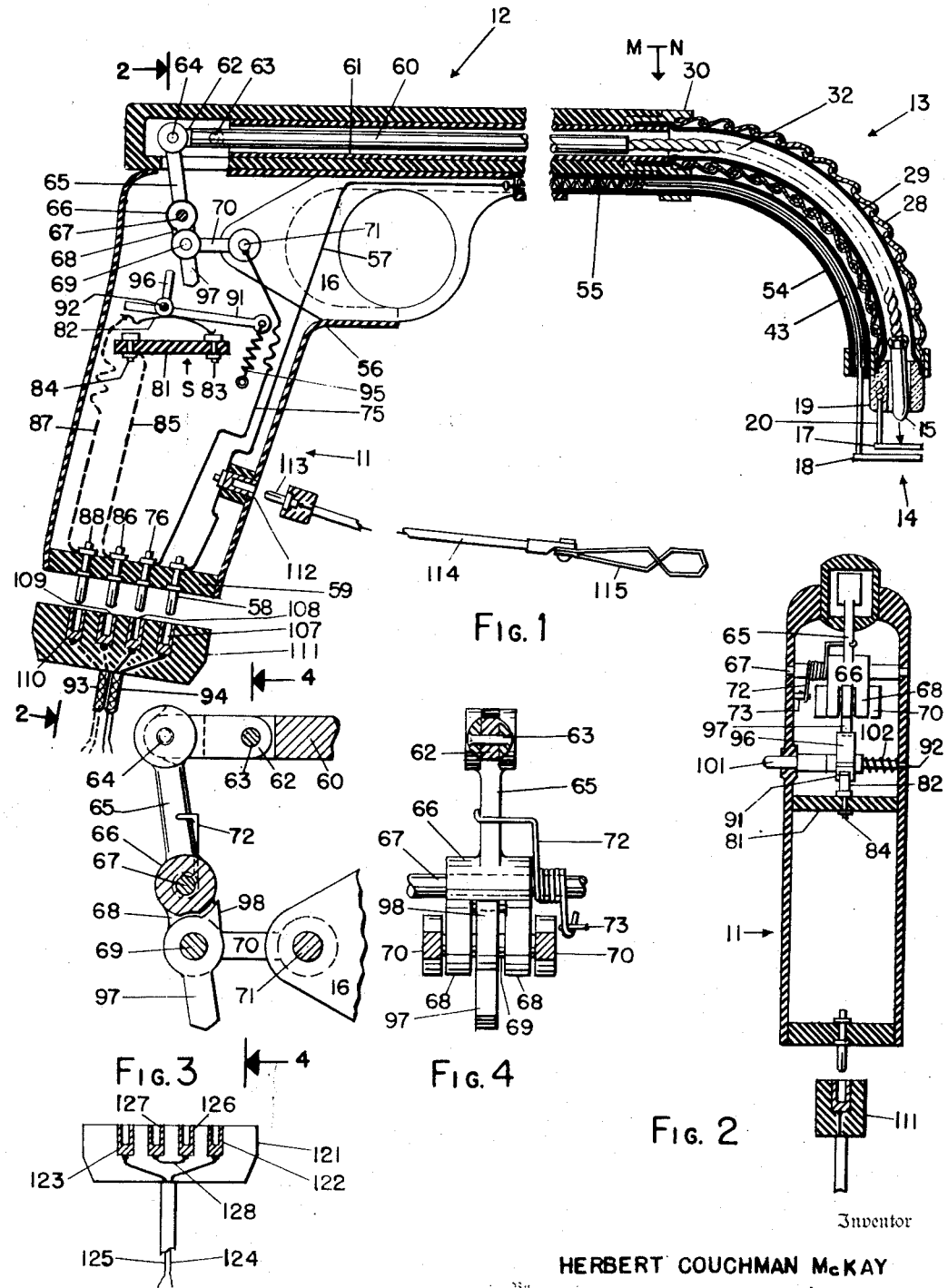
July 29, 1952 — H. C. McKAY — 2,605,379
AUTOMATIC THERMAL METAL-JOINING TOOL
Filed Dec. 27, 1944 — 5 Sheets-Sheet 1
Inventor
HERBERT COUCHMAN McKAY

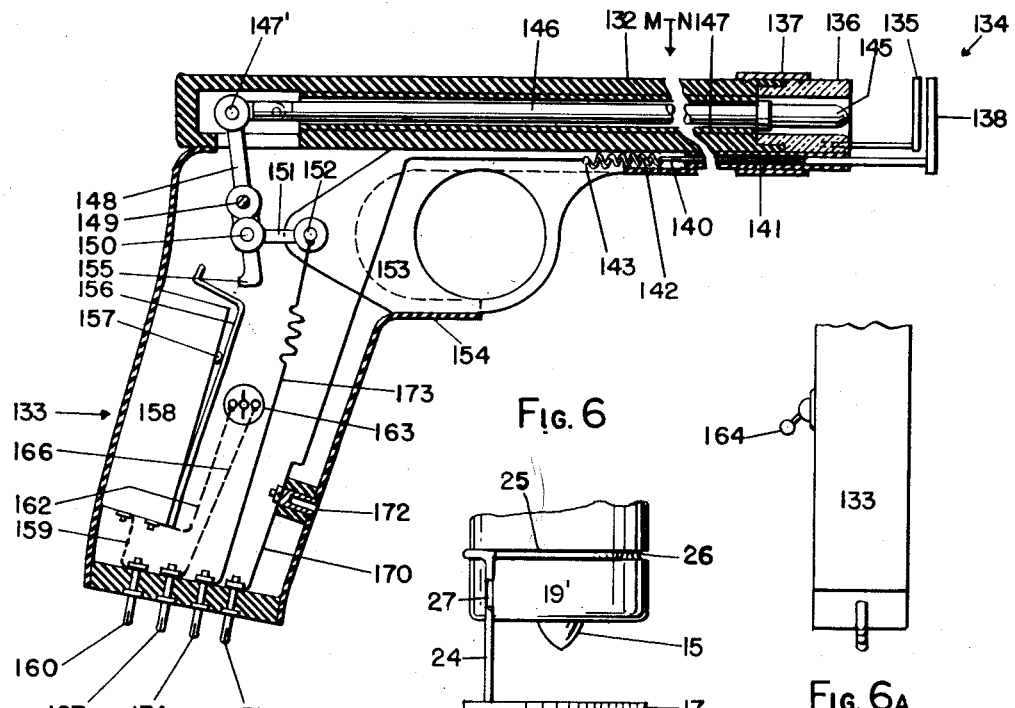
Fig. 6
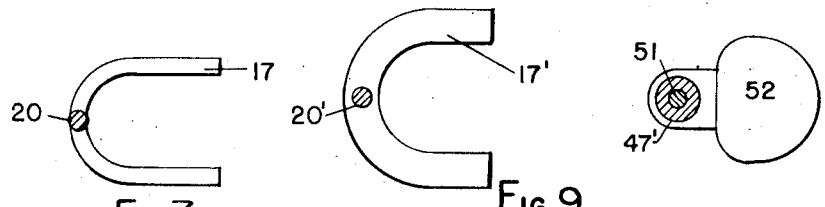
Fig. 14  Fig. 6A
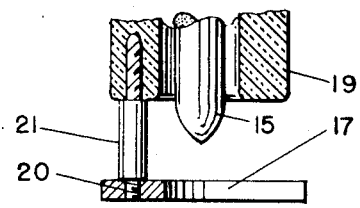
Fig. 7  Fig. 9  Fig. 11
Fig. 8  Fig. 10  Fig. 12
Fig. 13
Inventor
HERBERT COUCHMAN McKAY

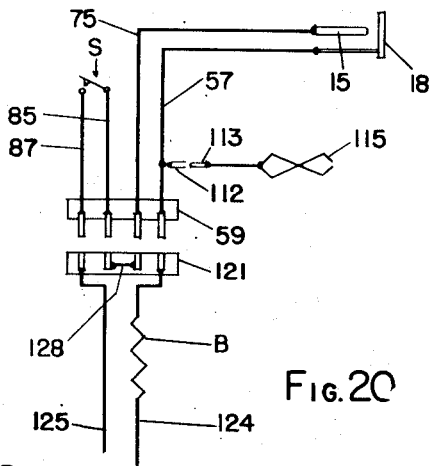
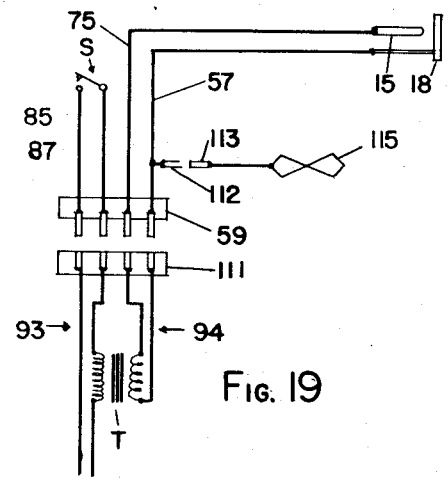
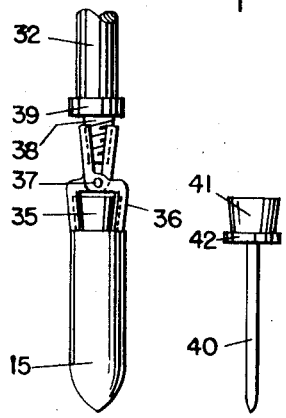
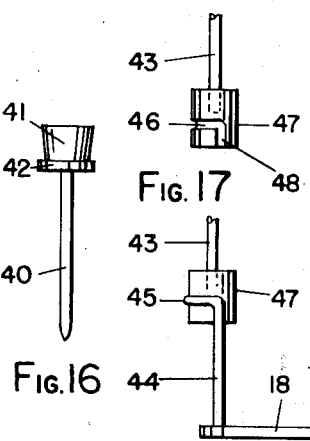
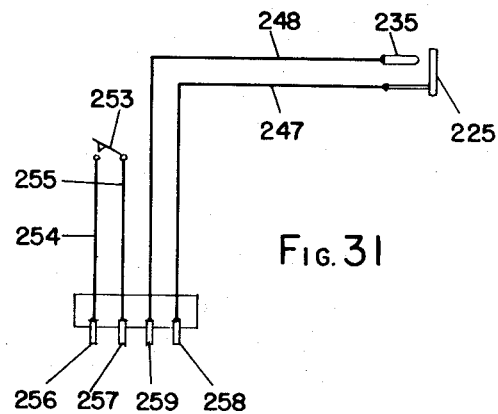
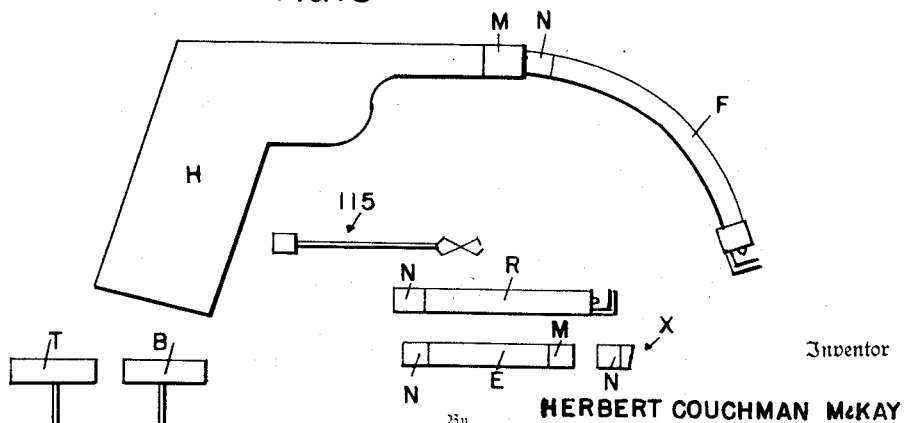

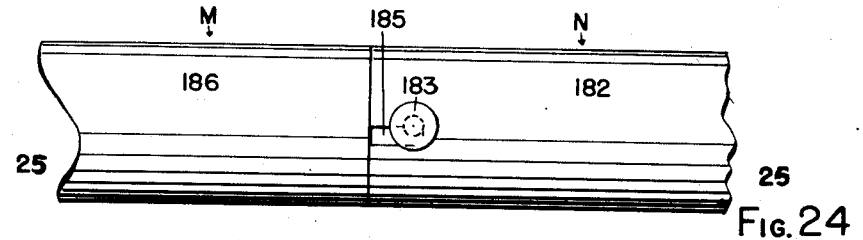
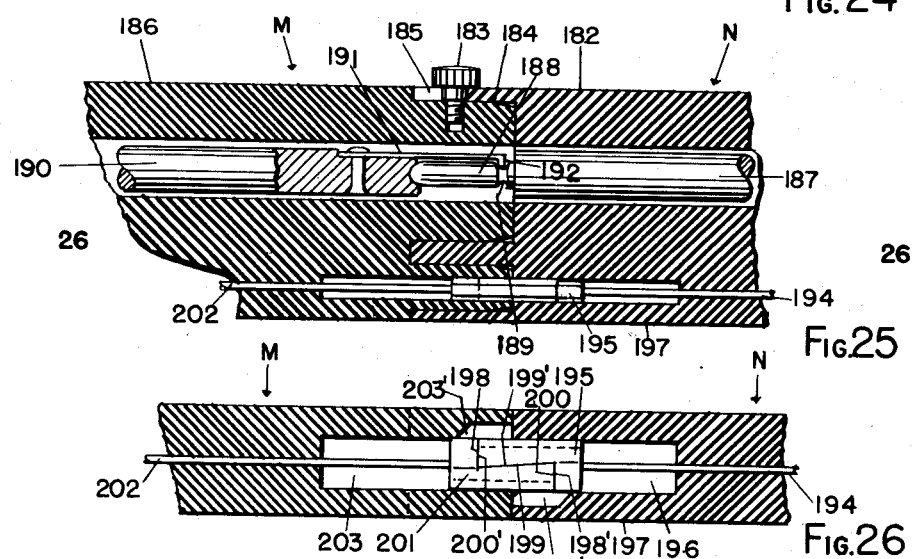
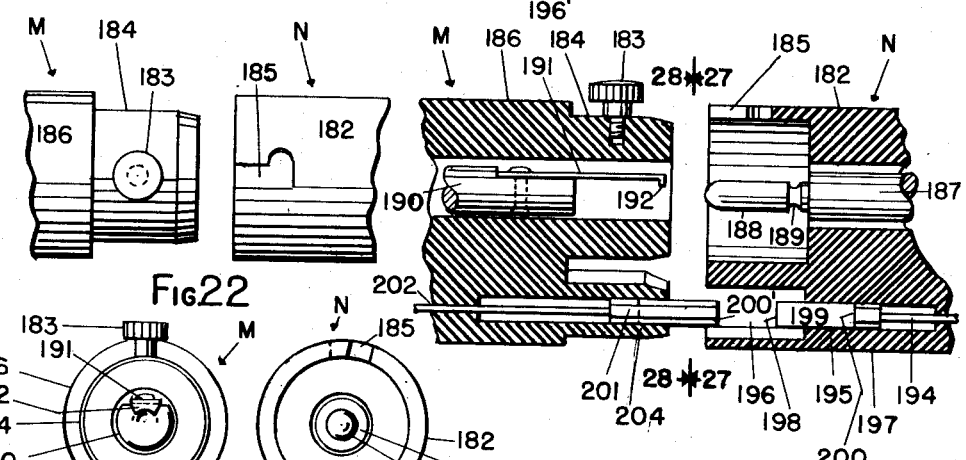
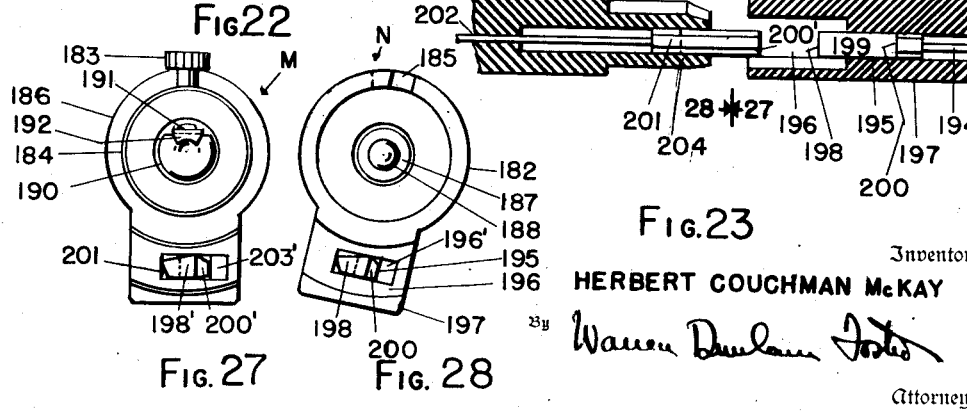

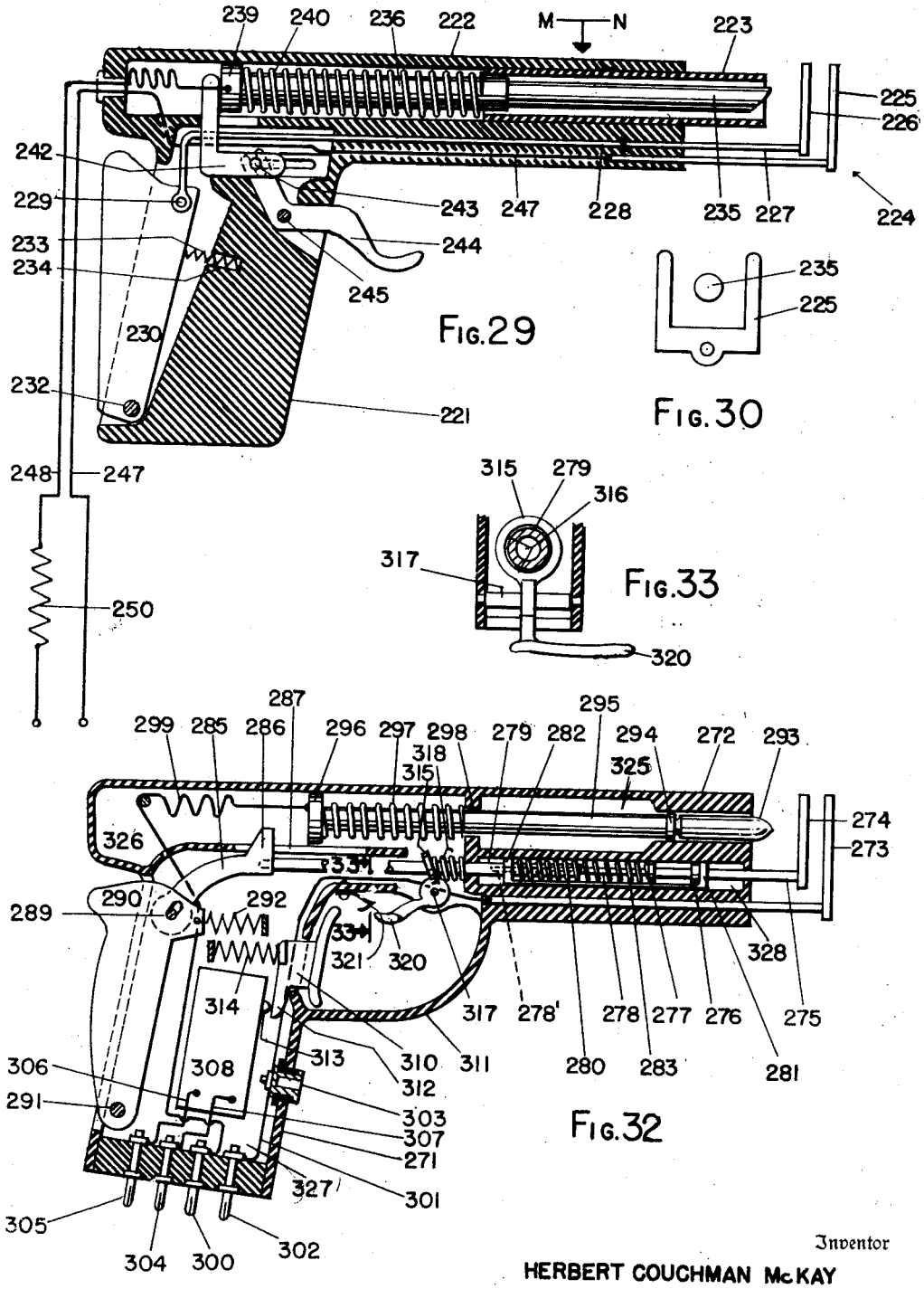

AUTOMATIC THERMAL METAL-JOINING TOOL

Herbert Couchman McKay, Eustis, Fla., assignor to Warren Dunham Foster, Eustis, Fla., and himself, as trustees Application December 27, 1944, Serial No. 569,969

56 Claims. (Cl. 219—26)

My invention relates primarily to a novel thermal metal-joining tool by which it is possible to carry out soldering and similar operations in a more quick, easy, economical, and efficient manner than has been previously possible so far as known to me. A user of this tool is enabled largely to restrict the heat necessary in a metal-joining operation to the spot upon which the work is being performed. Although my invention is described as a soldering pistol it is almost equally well adapted for use in light welding particularly in the type known as "spot welding" and in brazing. It is particularly useful in soldering electrical connections and small pieces of metal as in radio and other electrical apparatus but it is equally applicable to any use wherein one desires to join pieces of metal quickly easily and economically.

I prefer to produce my metal-joining tool with a pistol butt or handle and a flexible work-engaging opposite end by means of which it is possible to reach into far corners to carry out soldering or welding operations which previously could be accomplished only with the greatest difficulty if at all. Also I prefer to provide a plurality of elements which are readily attachable to this tool and detachable therefrom by means of which its effective length can be readily changed, or a rigid end may be substituted for one which is flexible. Also my invention includes the provision of any one of a plurality of work-holding instrumentalities. Thus I provide a single metal-joining tool by which one can accomplish results which previously demanded several special tools if in fact they could be accomplished at all, all as will later appear.

My invention includes the use of a thermal tip which is operated either through a transformer or by a line direct from a main but having a ballast resistance. The instrument is preferably so wired that either of two connectors one accommodating ballast and the other a transformer may be used and in either case preferably providing alternative means whereby if desired the work circuit can be completed by an electrical connection to a remote portion of a metallic object which is electrically connected to the metals being joined. I provide means which prevent arcing either within the tool or even more important at or adjacent the work area.

A pistol holder or butt such as I prefer to provide may be readily grasped by one hand. The flexible nose, if it instead of a rigid nose is used, may be readily bent into any one of many different shapes in order to reach otherwise inaccessible positions. I prefer to employ work-holding stirrups attached to a nose which when moved together form a clamp which holds in place the work to be soldered or otherwise joined. An important feature of my invention is that this clamp is separate from a conducting tip. After the clamp has been operated to bring the parts which are to be soldered or welded into proper position and to hold them therein, the conducting tip is advanced and operated and the work circuit closed, all by common control means.

For the majority of purposes this tip is of carbon although any suitable conductor may be used for such work if a carbon tip is inefficient, as for example in "tinning." An included feature is that current is not applied to this tip until after it has engaged the material to be heated so that there is no arcing. If desired, in a preferred form of the invention, the circuit to the tip is broken prior to the removal of the tip from the soldered joint so that the pressure of the tip holds the pieces of work firmly together until they are sufficiently cool to retain their respective positions. In some forms of my invention the tip is removed while the metallic pieces which have been joined are still held together by the clamp. This entire operation is carried out by one hand.

In a preferred form of my invention a user grasps the butt of the tool as he would a pistol, and after having placed the nose of the tool in position, with the index finger of his holding hand the user moves a trigger toward the butt. The first portion of this movement accomplishes the necessary clamping, a following portion applies the tip, and a final portion completes the circuit. Thereupon the resistance in the carbon or other tip instantly heats the metal to be joined and the solder is applied as by the free hand of the user. Thereupon if desired the user by an instant light pressure of the thumb of his holding hand breaks the circuit to the carbon or other tip but maintains the parts in the relation just described. Thus there is no danger of arcing and the parts which have been joined are not disturbed by the removal of the tip during the instant which follows the soldering or welding operation. This retention of the tip in position for a second or two after the soldering or the like has been completed is particularly valuable when fine wires as in a thermocouple, for one example only, are to be joined by soldering.

In order to give greater versatility to the instrument I prefer to make the nose removable so that a straight and rigid nose may be substituted where a rigid tool is desired or so that intermediate spacing elements may be provided thus materially lengthening the tool. Alternatively, rigid noses of any desired special shapes, preferably interchangeable, may be constructed. Also I prefer to provide a plurality of different and interchangeable stirrups, such for example, as heavier stirrups for welding or brazing and lighter stirrups for soldering. Or I may provide stirrups of different forms. Also under some conditions particularly where the parts to be joined are almost inaccessible I may use a tip without a stirrup. In this case I complete a work circuit through the metal to be joined. To that end I prefer to supply an electrical connection to which is readily attachable an an auxiliary connector which can be clamped to a portion of the metallic object to which another piece is to be attached or one electrically connected thereto thus taking the place in the circuit of the otherwise electrically active stirrup.

My invention includes electrical arrangements of such nature that the same tool may be powered interchangeably by a transformer or a ballast resistance. To that end I provide a switch or switches within the body of the tool which will break either the primary circuit of a transformer or a resistance-fed work circuit, the different electrical arrangements for the two sources of power being included within connectors supplied with each and not within the tool. A related object is to apply means for controlling a high-resistance thermal metal-joining tool solely to a low amperage circuit.

In an alternative form of my invention the structure may be entirely rigid with the flexible nose omitted or a common handle may be supplied to which either a rigid or a flexible nose may be applied or an extender may be interposed between a handle and base and any desired type of nose thus lengthening the tool at will and providing either a flexible or a rigd working end. In another form of my invention a clamp is operated by a safety grip and an electrode tip advanced by a trigger with the power circuit controlled either by a third instrumentality within the reach of the hand of a user as he grips the instrument or by the advance of the electrode tip or by any of the several other electric arrangements which are included within the scope of my invention. In still a further embodiment both the clamp and the electrode tip may be under the control of a safety grip with the power circuit independently operated by means of a trigger. In this instance the timing is so arranged that before the tip electrode can be removed from the work piece its circuit is broken.

With any form of my invention although preferably with that last above mentioned I provide an instrumentality which locks the clamp into position, if desired. Thus in the one tool there is provided what in effect is a vise as well as metal-joining instrumentalities. This arrangement is particularly valuable for use as by jewelers' instrument makers and others who are concerned with fine work.

Although I describe my invention as embodied in the above and other forms it is particularly to be noted that any type of nose may be used with any type of control mechanism. A flexible nose such as I provide has many advantages because it may be readily preformed by hand into any particular shape whereby a user may reach a work area which otherwise would be inaccessible. For heavier work and more accessible work however a rigid tool may be more effective. According to this invention I may provide either a rigid tool or a flexible tool each complete in itself or a tool the working portions of which may be either rigid or flexible owing to the interchangeability of the parts.

I illustrate my invention as including a pistol grip or the like, a construction which I have found particularly valuable. It is not so limited however.

In the past soldering most commonly has been carried out by the use of a soldering iron of relatively large bulk which is pre-heated by an external or a self contained flame or by an electrical resistance element or even an arc enclosed within its point. This large mass of metal, which must be heated in advance of its use and kept hot, is then introduced at the point at which the soldering is to take place. Since it is relatively large as well as hot there is great danger that as it is being introduced and during its use or when it is being removed it will burn parts adjacent to those which are to be joined. Moreover in order to accomplish a satisfactory union it is necessary to apply heat to the part which is to receive the solder. If the iron is relatively large this operation can be more quickly carried out but the danger of injury by heat to surrounding parts is much increased. If the iron is relatively small that likelihood of injury is decreased but the iron must be kept in position for a relatively longer period. Moreover, long continued heat is very likely to "burn" the solder; that is, to cause it to change to a crystalline structure which does not furnish a proper bond. Also, long continued heat causes drops of solder to run from the parts being joined to places where they are unsightly and may cause damage. If in order to avoid the difficulties caused by an excessive amount of heat a user applies insufficient heat, as is common, the resulting joint is "spongy" and "mushy" or otherwise unsatisfactory. In any event the iron must be continuously heated thus requiring a large amount of current if the operation is electrical. As every plant manager knows to his sorrow this heat is a cause of innumerable minor and many major burns as well as that of burned insulation, marred finish and other injuries to the goods upon which the work is being done.

In order to avoid these difficulties others prior to me have suggested the use of arc and other similar devices in an effort to obtain some of the advantages of my novel tool. Instant application of high temperature without excessive heat to metallic parts to be joined results in a good joint in minimum time. Moreover, since this heat is applied only to the exact area where a junction is to be made and continues for only an instant the surrounding parts are not heated. Soldered junctions of wires or wax encased condensers only a fraction of an inch away are undisturbed, to give two examples only. Although the temperature created by my tool at the instant of its application often reaches 5000 degrees Fahrenheit and that of the conventional iron only 700 to 800 the heat of the conventional iron is likely to damage the surroundings of the work while the temperature of my novel iron results in a much better joint. My tool is characterized by the ability to raise to a high point the exact work area at the moment of the joining; the conventional iron the relatively wide and long dissemination of useless and indeed harmful heat. Since my tool is cold when it is introduced, as it is removed there is no danger of injury from heat to the object within which joints are being made. Also, a tool in which the heat is furnished by a small area which is raised to a high temperature can be built very much smaller than a conventional soldering iron of comparable power. As a result, such a tool may be introduced into spaces from which a conventional iron would be excluded by its size. A small iron also can be handled more accurately, is less likely to injure surrounding parts by contact, and causes less fatigue to its user.

The quality of work which is turned out by a tool which instantly raises a small work area to a high temperature is much better than that by a conventional iron. Because heat of high intensity is applied for only an instant, it is not conducted away by a large piece of metal. Consequently with my relatively small tool I am able to solder a joint including a piece of metal so large and of such high conductive capacity that no piece can be soldered to it by a conventional large iron. In the actual operation of soldering this great heat carefully localized quickly brings the metals to be joined to optimum temperature yet it is continued for so short a time that there is no danger of "burning" the solder or causing globules to flow off as a result of oxidization of the surface. Iron and steel can be soldered as easily as brass, as cannot be done by a conventional iron unless very large. Moreover as is obvious to those skilled in this art, a conventional soldering iron cannot be used for welding or brazing.

The heat of such a tool is sufficiently high so that it will burn off impurities from a piece of some metals which has been imperfectly cleaned. It should be remembered that cleanliness in a metal-joining operation refers not alone to grime and grease, but to films of metallic oxides which form when almost all metals are heated. If the metal is massive and the available heat relatively low in quantity, the metallic mass heats slowly and before it has reached the correct temperature, the oxide film has formed and an inferior soldering job results if indeed the pieces do not refuse to bond at all. Thus it is essential that the pieces to be joined be brought to proper temperature as rapidly as possible.

The economy of a metal-joining tool such as this is amazing. My soldering pistol of a relatively small type operates upon approximately five hundred watts, through a transformer (or upon about two hundred watts through a ballast) in one illustration only. Five hundred watts may be taken as a standard requirement of an electrically heated iron. For purposes of illustration, assume an assembly job in which ten soldered joints are to be made which for arranging adjustment and the like require twelve minutes. Thus in an hour a workman completes five jobs with fifty soldered joints. Since a conventional iron must be continuously heated four kilowatt hours have been consumed for four hundred joints; not counting the time necessary for preheating. In my tool, however, these four hundred joints will require approximately four hundred watt seconds or less or one-tenth of a kilowatt hour. A saving of over 90 percent of any power bill is important.

In spite of these and other great advantages of the use of instant localized heat of great intensity for soldering, as well as welding or brazing, tools embodying it have not been widely used, so far as known to me, evidently because of difficulties which have existed in the proposals of others. My novel tool completely eliminates these difficulties and, for the first time so far as I am aware, brings these advantages in a practical, safe and convenient form to the soldering and related arts. A principal object of my invention therefore is to make the advantages of instant high heat within the work area only available for soldering, as well as light welding and brazing, and to overcome the several disadvantages previously applying to proposed metal joining tools embodying an electrical arc or other devices for accomplishing the same ends.

Such previous disadvantages have been many.

Almost all such proposals known to me in the past have included the use of an arc. Although an arc does furnish instant high heat, the very existence of the arc shows that the heat is not terminated by the initial separation of the tip and the work. Drawing the arc increases the temperature and the area which is heated and in the case of delicate pieces the metal may be completely burned through before the arc breaks. At best, the solder will probably be burned.

My tool has all of the advantages of those which would be enjoyed by one making use of an electrical arc and none of the disadvantages. In one example, such a carbon iron by its nature is necessarily so designed as to offer a serious electrical hazard to a workman who is using it. Although I know of one tool proposed by others making use of a carbon arc which has eliminated the danger of burns or other injury from heat, it substitutes exposed electrically active parts which cause even greater hazards. Other proposed tools including a carbon arc have added electrical dangers and increased danger from heat. There is absolutely no such danger in a tool which is produced in accordance with this specification.

Other tools have been proposed in which the material is clamped between movable members such as those which form the nose of pliers and then carbon electrodes have been advanced into position to strike an arc. Such tools so far known to me have been relatively clumsy and large and have not been so designed as to clamp the work closely adjacent the point at which the soldering is to be applied. Moreover they have supplied no ready means whereby the circuit feeding the arc can be made and broken except by the placing of the electrodes in contact with the metal to be heated and their subsequent removal therefrom, such contact and removal each causing dangerous arcing as noted above.

A tool made according to this invention is so constructed as to hold parts to be joined, whether large or small, in their correct relation. I prefer a clamp which is made up of two horseshoe-shaped stirrups which grasp the parts to be joined at points surrounding the exact spot to be soldered but leave that part free for engagement by the tip which causes instant high temperature. Such clamps provide the greatest accuracy in determining the point of impact of the heat. The heat is not applied until the tool is positioned and steady. The provision of a clamp separate from one of the electrodes but jointly controlled with it has many advantages.

I prefer to break the circuit to the heat applying instrumentalities either by operation of a switch by a positive movement of the hand which is holding the tool before the tip is removed from the work piece or by a definite and certain portion of the movement of the tip away from the work piece.

A most important object of my invention is the provision of a tool which avoids the dangers of the conventional iron and has the efficiency of a carbon arc but without the introduction of new dangers. In a tool built according to this invention there is no possibility of the point of application of the heat wandering. It is limited to the exact point at which it is needed. Except at the exact area where the heat is being applied and except during the instant when it is being applied the tools by which I prefer to practice my invention have no exposed parts which are electrically active. Except adjacent the tip and then before the circuit is broken there is no possibility of an electrical burn or short circuit.

An object of my invention to provide a thermal metal-joining tool which without danger to objects or workmen instantly raises the temperature of only those surfaces to be joined to a degree best suited for soldering, light welding or brazing, always without application of excessive or long-continued heat.

For example, I have illustrated my invention as applied to a hand tool but it will be readily understood that many of its features are equally valuable as included within tools which are permanently mounted.

The general objects of my invention will be apparent from the foregoing portion of this description and that which follows. Other objects include the provision of a metal-joining tool which is largely automatic in its use and hence very simple and easy to operate and is so constructed and arranged that it may be applied to many different uses.

Other purposes of this invention include the provision of improved means for holding a tip heated by a high resistance with which pieces of metal are joined, providing improved clamping and holding means as well as means for controlling the movement of the operable parts of an automatic metal-joining tool and a circuit feeding such a device.

Another principal purpose is to provide a much improved and versatile soldering iron.

Among the objects of this invention is the provision of the devices, mechanisms and combinations stated above and hereinafter. Other objects, advantages and characteristics will be evident from the following portion of this specification, the accompanying drawings and the subjoined claims. Although I am showing preferred forms only of my invention for purposes of illustration, it will be understood that changes can readily be made without departing from the scope of my broader claims or the spirit of my invention.

In the drawings:

Figure 1 is a longitudinal section of a preferred form of my soldering pistol, certain parts being omitted for clarity.

Figure 2 is a vertical section taken on the line 2—2 of Figure 1 and looking in the direction of the arrows.

Figure 3 is a fragmentary enlarged sectional view corresponding to a portion of Figure 1 and showing operation of certain of the mechanical control mechanism by a trigger of the apparatus.

Figure 4 is a detailed and enlarged view partially in section taken on the line 4—4 of Figure 3 and looking in the direction of the arrows.

Figure 5 is a view of an alternative attaching element to be used in place of that of Figure 1 when ballast instead of a transformer powers my tool.

Figure 6 is a showing corresponding to Figure 1 of a form of my invention wherein a rigid nose is provided and no parts are interchangeable and with different electrical arrangements. Certain parts are omitted for clarity.

Figure 6a is a rear elevation of the structure of Figure 6.

Figure 7 is a top plan view of a relatively fixed stirrup of Figure 1 adapted for use when the tool is employed for relatively light soldering work and Figure 8 shows a corresponding movable stirrup.

Figures 9 and 10 are top plan views which show similar stirrups but adapted for heavier work.

Figure 11 is a top plan view partially in section which shows a foot or clamping element to be used as for spot welding.

Figure 12 is a vertical section of the structure of Figure 11.

Figure 13 is an enlarged detailed view which shows means for connecting a stirrup to its support.

Figure 14 is a side elevational view partly broken away which shows an arrangement alternative to that of Figure 13.

Figure 15 is a side elevation which shows preferred means of attaching a carbon or other tip to the apparatus and such a tip.

Figure 16 is a view corresponding to Figure 15 but showing another type of heat-applying tip suitable as for fine work.

Figure 17 is an enlarged detailed view corresponding to Figure 14 which shows a connector for the other detachable stirrup which makes up the clamp.

Figure 18 is an enlarged detailed view which corresponds to Figure 17 but shows such a stirrup in position.

Figure 19 is a wiring diagram of a preferred form of my invention wherein a transformer is employed.

Figure 20 is a wiring diagram corresponding to Figure 19 but showing the application of ballast resistance to the apparatus without a change in the internal wiring thereof.

Figure 21 is a diagrammatic sketch showing various elements which in various combinations may be used together to carry out my invention.

Figure 22 is a top plan view of two separable elements about to be joined.

Figure 23 is an enlarged section corresponding to Figure 22 but rotated ninety degrees.

Figure 24 is a top plan view of my device at a point where two separable elements have been joined and corresponds to Figure 22 but after the joining operation has been completed.

Figure 25 is a section corresponding to Figure 23 but after the elements have been joined.

Figure 26 is a sectional view corresponding to the lower portion of Figure 25 but rotated ninety degrees.

Figure 27 is an end elevational view taken on the line 27—27 of Figure 23 and looking in the direction of the arrows and showing the structural characteristics of element M of Figure 23 before it has been united with element N.

Figure 28 is a view corresponding to Figure 27 but taken on the line 28—28 of Figure 23 and looking in the direction of the arrows and showing element N rotated preparatory to being brought into contact and cross sectional alignment with element M.

Figure 29 is a longitudinal section which corresponds to Figure 1 and shows an alternative form of the invention, certain parts being omitted for clarity.

Figure 30 is a front elevational view of the operating end of the tool of Figure 29 and showing a stirrup and a tip.

Figure 31 is a showing largely diagrammatic showing electrical arrangements which are alternative to those of the embodiment of Figure 29.

Figure 32 is a longitudinal section partly broken away showing a form of the invention alternative to that of Figures 1, 6 and 29 wherein one control element closes a clamp and another operates a work circuit, the clamp being optionally operable as a vise. Certain parts are omitted for clarity.

Figure 33 is a section taken on the line 33—33 of Figure 32 and looking in the direction of the arrows.

In considering the drawings hereof it should be remembered that they are enlarged for clarity. My tool for use even upon heavy work may be only slightly larger than the drawings as reproduced in the published patent. The entire barrel of the tool, for example, may be no more than one quarter of an inch in diameter, the tips, which are the heart of the tool, running from one-eighth to three-eighths of an inch in diameter, more or less.

In this description such words as "forward" and "forwardly" are employed from the point of view of a user of the tool and indicate a position relatively distant from him. Contrary words such as "rear" or "back" or adverbs made therefrom indicate a contrary position relatively close to him, except as specifically noted. "Downwardly" and "upwardly" and the like refer to the tool as normally held in the hand and also to the parts as shown in the drawings.

In the sub-joined claims I speak of "a work piece" as, for example, being held in position for the application of heat and solder thereto. As a matter of practice two or occasionally more pieces are ordinarily so held but for simplicity of phrasing I use a singular form to include the plural, and the claims should be so understood.

The form of my invention shown in Figure 1 shows a metal-joining tool with a flexible nose and means controlled by a trigger which operate a clamp and normally the electrical system. It consists essentially of a handle or butt 11, a barrel 12, a flexible nose 13, a clamp 14, and a tip 15 generally of carbon but often of other substances as elsewhere stated. As the clamp is closed to hold work pieces together tip 15 engages them and a circuit is closed thereby applying heat. It will of course be understood that this supporting handle 11 may be of any convenient or practical shape although I have found that one such as used upon automatic pistols is excellent. This butt houses the operating linkage and a switch both of which are operated by a trigger 16 (supplemented in respect to the switch as later described). Mounted upon the handle or formed integrally therewith and extending forwardly therefrom is the supporting barrel generally indicated as 12. Mounted in turn upon this barrel is the nose 13 which at its forward end supports the clamp 14 and the electrode tip. A first portion of the movement of trigger 16 first operates the clamp, next brings the tip into position, and third and finally closes the circuit thereto.

Alternatively and as previously and hereafter pointed out several different tools may be made out of a few units, as is illustrated diagrammatically in Figure 21 and mechanically in Figures 22 to 28. For example, a rigid nose such as that illustrated in Figure 6 may be substituted for the flexible nose of Figure 1 or a lengthening unit E such as shown in Figure 21 may be employed between the barrel of Figure 1 and the flexible nose of Figure 1 or the rigid nose of Figure 6. Attachment of such units may be as shown in Figures 22 to 28.

The clamp generally indicated as 14 by means of which work pieces to be joined are held in position includes a fixed stirrup 17 and a movable and contact-forming stirrup 18 both preferably of horseshoe shape. I prefer that these stirrups be made removable so that others may be substituted (but attaching means for simplicity are not shown in Figure 1). As illustrated in Figures 7 to 12 both inclusive different types of stirrups may be employed depending upon the particular kind of work which is to be done.

In the manner shown in Figure 13, or alternatively in Figure 14, a fixed stirrup 17 is attached to a fixed supporting block 19. This block is formed with a central opening through which the tip 15 operates. Since this is the only locality in the tool in which high heat appears this block must be of high heat resisting capacity as well as electrically non-conducting. It is shown as of porcelain. In Figure 13 stirrup 17 is shown as attached to block 19 by a threaded pin 20 which is formed with a central enlarged unthreaded portion 21. By reason of this construction it will be seen that a user may quickly screw this stirrup into position or unscrew it when he wishes to use another stirrup or none at all. The central enlarged portion accurately spaces the stirrup so that its work-holding surface is always disposed in the same relative position.

In the alternative construction of Figure 14 rod 24 extends vertically from stirrup 17 and at its upper portion is formed into a circular spring clip 25 offset from the lower portion by a length greater than 180 degrees which engages a groove 26 with a depending vertical extension 27 formed in a lower end of an insulating block 19' which corresponds to block 19. The end of the clip is slightly flared for easy engagement. The material of which this clip is made is sufficiently resilient so that as a user slips it into place the clamp is firmly held in its proper position. Thus one stirrup can easily be removed and another substituted. A spring clip of this sort withstands heat better than does a threaded member. A threaded member, however, is desirable for heavy work.

Block 19 as shown in Figure 1 is fixedly attached to the forward end of a flexible metallic tube 28, many different kinds of which are upon the market. This tube is lined with a flexible insulating material 29, such, for example only, as fiberglass or similar woven material of high insulating quality. The opposite or inward or backward end of this tube is shown as fixedly attached as by soldering to a connecting tubular collar 30 fixed to the outer end of barrel 12. When it is desired to make the nose detachable a construction such as that shown in Figures 22 to 28 both inclusive and later to be described may be employed.

Tip 15 is movable through a central opening in block 19 or 19' to and from its work position by a relatively heavy cable 32 moving within the insulated lining of tube 28. This cable also serves to feed the tip electrically. Means for connecting this cable and trigger 16 will be described later. This cable preferably is of bronze or steel, rather than copper, for enduring elasticity. I prefer to employ the connective means of Figure 15 for the tip.

Tip 15 has a reduced upper end 35 in the shape of a truncated cone adapted to receive a pair of irregularly shaped grasping pincers 36 pivoted upon 37 and resembling ice tongs in miniature. The upwardly extending inward portion of these tongs is threaded to engage a conical screw 38 which depends from collar 39 which is attached to cable 32. As a user screws the tongs carrying the tip into place these pivoted members are engaged by the conical screw and are moved (apart at the top and together at the bottom as viewed in Figure 15) tightly to grip the top or attaching or conical portion of the tip.

Such improved and novel means are useful for holding any tip in place but are particularly advantageous when carbon is employed. Placing and holding a carbon cylinder in an ordinary clamp or in a holder provided with a set screw presents difficulties. Carbon is somewhat difficult to handle and a screw socket or one including a set screw is likely to become corroded by high heat. This form of attaching member is valuable for holding other objects in place particularly when firm contact as to establish an electrical connection and easy interchangeability are necessary and high heat is encountered.

As for welding, including spot welding, and brazing a copper tip is desirable and in fact for relatively heavy work it is necessary. It will therefore be understood that tip 15 may be made of copper or other metal suitable for the particular work in hand.

As previously stated my invention is particularly applicable to fine work including as for example that carried on as by a jeweler or manufacturer of fine scientific instruments. In Figure 16 for use for such purposes I illustrate a very fine tip 40 made out of carbon or any metal appropriate to the work in hand. This electrode includes a tip formed into an elongated or needle-like heat applying element, a shoulder 42 and a truncated cone 41 to which the tongs of Figure 15 may be applied. By reference to Figure 16 it will be readily understood that such a structure may well be utilized in place of the one just described.

I may prefer detachably to connect movable stirrup 18 to its supporting wire 43 as is shown in Figures 17 and 18 in a manner similar to that illustrated in Figure 14 as applied to relatively fixed stirrup 17. If desired and particularly for heavy work a threaded connection may be employed. This stirrup 18 is made electrically active when a soldering or welding operation is to be carried out. As shown in Figures 17 and 18 stirrup 18 is supported by an inverted L-shaped rod 44 having a horizontally offset portion 45 formed into a semi-circular clip with an outwardly offset free end which engages a horizontal groove 46 of a length greater than 180 degrees which is formed in a metal collar 47 attached to the end of wire 43. If the attaching partial circle were less than 180 degrees the stirrup might not be held rigidly in place. The horizontal portion of this groove is joined to a depending vertical extension 48. A user may move this clip into position or remove it therefrom, the horizontal portion having sufficient resilience to act as a spring clip.

It will of course be understood that neither stirrup need be interchangeable but if desired may be permanently fixed. For simplicity, showing of the means for attaching the respective tips and stirrups is not repeated in Figures 1, 6, 29 and 32.

As previously stated different forms of stirrups may be provided. As shown in Figure 9 a stirrup 17' corresponding to stirrup 17 of Figure 7 may be supplied. It may be supported as by a vertically extending rod 20' which may correspond to previously described rod 20 and be supplied with a spacing element corresponding to 21. Alternatively a spring clip arrangement may be employed. Figure 10 shows a movable stirrup 18' corresponding to movable stirrup 18 previously described and may be similarly supported. These stirrups are heavier than those previously described and are valuable for heavier work such as welding and brazing.

Particularly when welding or brazing is to be done a movable clamping member may be employed either with a fixed stirrup such as that shown in Figure 10 or with no second stirrup at all but with a heavy copper tip serving both as an electrode and a clamping instrumentality. In such cases a heavier solid foot may be used. As is shown in Figures 11 and 12 a vertical rod 51 may be employed to attach foot 50 to block 19 or 19', a spacer 47' corresponding to 47 previously described being included. As will best be seen by observation of Figure 12 an upstanding pad 52 rises from the foot. In this arrangement the tip 15 serves as the movable member of the clamp, the circuit being completed through attachment 115 later described. Alternatively and often preferably, however, this foot may be attached to movable wire 43 and a fixed stirrup such as 20 retained. In this case the tip works through the horseshoe shaped opening in the fixed stirrup and the electrical circuit is completed in the usual manner as later described.

Wire 43 to which all movable stirrups of whatever design are attached is movable within a flexible tube 54 which is placed adjacent to tube 28 previously described but is independent thereof because of the different radii upon which the arcs of the two tubes may be moved. This tube may be made of an electrically insulating flexible material, as, for one example only, fiberglass. Wire 43 is attached to a spring 55 which is disposed in a forward portion of rigid barrel 12 and in turn is attached to trigger 16, which is made of electrically non-conducting material, and movable thereby. Trigger 16 is guided and protected by a suitable guard 56. An insulated lead 57 extends from this spring to a jack 58 in the male portion of connector 59 thus connecting movable stirrup 14 with its source of power. Insulating tube 54 is continued well into the barrel and about spring 55 thus insulating it from the barrel.

It will be understood therefore that as trigger 16 is moved toward the user or to the left as shown in Figure 1 stirrup 18 will be moved against stirrup 17 and the clamp will be closed. As this movement continues however through linkage and other mechanism about to be described the tip 15 is thereafter moved into contact with the work piece and subsequently the switch later to be described is operated to close the circuit. Consequently it is necessary that after the stirrups have been brought together and the clamp is closed further movement of trigger 16 be permitted. Spring 55 permits such movement and serves as a conductor of both current and movement.

At the same time as the clamp is being closed the tip 15 is moved in an opposite direction and brought into contact with a work piece. To this end linkage between trigger 16 and wire 32 is provided. This linkage also operates the switch to circuit-closing position and subsequently if desired to circuit-opening position.

Such movement is communicated to tip 15 through cable 32 and a simple system of links and levers which also operates the switch. See Figures 3 and 4. Wire 32 is connected to a thrust rod 60 working in an insulating tube. A short link 62 attached to a bifurcated end of rod 60 as by a pin 63 is connected as by a pin 64 in turn to an irregularly shaped operating lever having an upstanding arm 65, a central enlarged portion 66 for receiving its pin 67, and two spaced parallel downwardly extending arms 68 (as shown clearly in Figures 3 and 4) for receiving cross shaft 69 by which motion is transmitted to it from trigger 16 through bifurcated link 70 which by pin 71 is attached to the rear of trigger plate 16 or to its leftward side as observed in Figure 3. A spring 72 attached to pin 73 is wound about shaft 67 and attached to upstanding arm 65 of the operating lever (Figure 2) and tends to move tip 15 to its inoperative position as shown in the drawings. A lead 75 extends from pin 71 to plug 76 of connector 59. All parts from this pin to the tip are metallic and suitably insulated.

Attention is particularly directed to the relatively great strength of those portions of this linkage by means of which power is applied to the short arm of the lever and through it to the clamp.

By reason of this construction it will be evident that as a user squeezes trigger 16 and moves it toward him or to the left as shown in Figures 1 and 3, the tip will be moved into contact with a piece of material held between stirrups 17 and 18 which by a previous movement of those parts have been moved to clamping position. Release of the trigger permits spring 72 first to retract the tip and thereafter to release the clamp.

This construction provides sequential timing linkage of which another component will later be described.

Flexible nose 13 and barrel 12 may be so constructed, as shown in Figures 22 to 28 both inclusive, that they may be separable one from the other. The flexible nose is equivalent to connecting element N and the barrel to connecting element M, as indicated by the arrow which in Figure 1 appears above the barrel. In that instance the backward portion of cable 32, or leftward as shown in Figure 1, is made solid and hence corresponds to rod 187 later described. Rod 60 corresponds to rod 190. Wire 43 is then made in two parts corresponding to wires 194 and 202 of the above figures. In such case the various combinations shown in Figure 21 and later described in connection therewith may be employed.

As previously pointed out as the tip is moved to a position wherein it engages a work piece, its circuit is closed. Such action is under control of trigger 16. Particularly in order that the circuit may be broken without arcing, a user may break this circuit before the carbon tip is removed from a work piece, all by mechanism which is about to be described.

A switch generally indicated as S and shown only schematically includes an insulating bridge 81 which extends transversely across the handle of the tool and supports a contact making spring 82 which extends from a dummy or dead contact 83 thereon toward a live contact 84 which by a lead 85 is connected to a plug 86 which is embodied in the male portion of connector 59. A lead 87 extends from this plug to the contact spring.

A relatively long switching bar 91 both pivoted on a transverse shaft 92 and laterally bodily movable thereon is so disposed that upon movement from the position shown in Figure 1 it engages the contact spring and closes the circuits 85—87 and 93 which feed a transformer T (Figure 19) which thereupon produces a work current through leads 57 and 75 to tip 15 and clamp 18. Normally this bar is held in circuit-breaking position by a tension spring 95. Movement of this bar to circuit-making position is communicated to it by engagement of its upward extension 96 with a short irregularly-shaped operating link 97 which is loosely mounted upon shaft 69 which is movable to a work position by trigger 16 and to inoperative position by spring 72. An ear 98 upstanding from link 97 (Figure 3) engages central portion 66 of the main operating link as the trigger is moved to the last stage of its operative position thereby holding link 97 from movement in a counter clockwise direction. See Figures 2, 3 and 4. Such engagement is effective to depress the rearward end of bar 91 and to close the circuits to the transformer. Contrary movement of the trigger permits spring 95 to elevate this end of the switch bar thereby opening contact spring 82. This construction supplies another component or part of a sequential control linkage by which the various parts of my tool are controlled in the desired timed operational relations.

I also provide simple means whereby a user may break this circuit at will in order to suppress the arc, as is best shown in Figure 2. Contact bar 91 with its upstanding operating arm 96 is so arranged that it is bodily movable at will out of alignment with operating link 97. When it is so moved, spring 95 in the manner previously described is released so that it operates the switch to break the circuit. A small button 101 attached to shaft 92 protrudes from the side of the handle where it may conveniently be pressed by a thumb of a user as he holds the tool by the butt. Such pressure inwardly toward the handle bodily moves bar 91 and arm 96 against the power of compression spring 102 which is coiled about shaft 92 out of engagement with operating link 97 thereby permitting spring 95 to break the circuit. When pressure upon button 101 is relaxed spring 102 returns the parts to the position shown in the drawings. If as is likely at this time depending operating link 97 is disposed to the rearward or left as seen in Figure 1 of upstanding arm 96 the link will ride over the arm as the parts return to the position shown in the drawings. Ear 98 holds link 97 in line with link 64 as the parts move toward operating position but the free mounting of link 97 on shaft 69 permits it to move freely as the parts are returned to inoperative position.

As will be readily observed from Figures 1 and 19 plugs 58, 76, 86 and 88 engage jacks 107, 108, 109, 110 respectively which are formed in a connector block 111 which is the detachable element of connector 59. These jacks are connected with circuits 94 and 93 which respectively are fed by and feed transformer T. By reason of this construction it will be observed that when connector element 111 is attached to the tool the work circuit which carries the heavy amperage is continuous and unbroken but that the control circuit by which the transformer is fed which is of relatively low amperage is subject to control by a switch or switches which are in the tool and instantly under the control of a user. The advantages of this construction are very great.

In such cases as a user wishes to join two pieces of metal one of which is attached to a relatively larger metallic part but is relatively inaccessible an auxiliary device of great value may be employed. A jack 112 is placed in series with lead 57 of the work circuit. An auxiliary element includes a plug 113 attached by an insulated cable 114 to a clamp 115. After removing the electrically active stirrup 18 and generally the fixed stirrup 17 from the nose of the tool a user attaches this clamp to a metallic piece which is electrically connected to the inaccessible piece which he wishes to reach. He then places insulated block 19 in contact with this piece, pulls the trigger which advances the electrically active tip 15 and joins the two pieces of metal, the circuit being completed through the work piece and clamp 115. For example, clamp 115 may be connected to a metallic chassis of a radio to which at a relatively inaccessible point another piece of metal is to be soldered. In such case block 19 is placed adjacent the work piece, the trigger is pulled thereby moving the tip into contact with the work and the circuit is completed in a manner previously described but through cable 114 and leads 57 and 75. One important use for this arrangement is with the structure of Figures 11 and 12 as previously stated.

As previously described and as best shown in Figures 5 and 20 I may substitute ballast resistor B for the transformer previously described and illustrated. A great advantage of my invention is that I may make this substitution without the slightest change in the internal wiring or other arrangement of the tool itself. In place of the connector block 111 I substitute a block 121 (Figures 5 and 20) containing jacks 122 and 123 corresponding to jacks 107 and 110 previously described and coacting with plugs 58 and 88 when block 121 is substituted for block 111. Jack 122 is connected to the resistance B in a lead 124 which extends to a main and jack 123 is connected to this main through the lead 125. Jacks 126 and 127 respectively engage plugs 76 and 86 of the tool itself but by a short lead 128 are shorted. By reason of this construction it will be readily apparent that by substituting one block for the other I may feed the arc from a line having ballast instead of through a transformer. No change within the body of the tool is necessary.

As pointed out hereinbefore the entire tool if desired may be made rigid and of one piece. In that case a structure such as shown in Figure 6 may be employed. A barrel 132 corresponding to barrel 12 may extend from a butt or handle 133. In this embodiment of my invention a clamp generally indicated as 134 may comprise a relatively fixed member 135, preferably but not necessarily of horseshoe shape as previously described, set in a block 136 which is constructed of non-conductive and heat-resisting material in the manner of block 19 and firmly mounted in the rightward or leading end of barrel 132 and held in place by a collar 137. A relatively movable stirrup 138 preferably in the manner previously described is attached to a stiff wire or small rod 140 generally corresponding to wire 43 previously decribed and operated in the same manner. Wire 140 is movable through an elongated insulated channel 141 closed except at the forward end. A spring 142 joins this wire to a pin 143 placed in trigger 153 later described.

In such cases as it is desired to make use of the interchangeable features illustrated generally in Figure 21 and in detail in Figures 23 to 28 both inclusive and as described in detail in connection therewith the structure described above may be slightly modified. As indicated by the arrow above barrel 132 a junction may be formed in the barrel, that portion to the right of a projection of the arrow corresponding to connecting element N and that to the left to connecting element M as viewed in that figure. In this case thrust rod 146 is made in two parts equivalent respectively to rods 187 and 190 and wire 140 in two parts equivalent to wires 194 and 202 respectively, all as will be clear from a later portion of this specification.

A tip 145 as in the manner previously described and illustrated in Figure 15 or 16 is attached to a thrust rod 146 which is enclosed within an insulating tube 147. Through linkage such as previously stated this rod is attached as by a pin 147' to a lever 148 which is pivoted upon a pintle 149 and through a cross shaft 150 and a double link 151 and a pin 152 to and operated by trigger 153 which operates within and is guided by a guard 154. A lower portion of this lever 148 is extended into a foot 155 which is so disposed that upon movement of the lever it engages a spring bar 156 which through a button 157 operates a heavy duty conventional micro-switch 158. One lead 159 from this switch extends to plug 160 which corresponds to plug 88 previously described in connection with Figure 1 and is similarly connectible to jack 110 in a control circuit. Another lead 162 from this switch extends to a conventional instantaneous contact switch 163, shown by a conventional symbol, which is operated by a button 164 placed exteriorly of the tool where it may easily be operated by a thumb of a user while he grasps the tool. This switch preferably is so arranged that when it is in open position removal of pressure upon the button will cause it instantly to close. Another lead 166 extends from this switch to a plug 167 which corresponds to plug 86 previously described and is connectible to jack 109. All of this structure is disposed within the handle 133 which corresponds to butt 11 previously described.

It will be noted that movement of switch button 164 will open the circuit which includes main switch 158 and irrespective of the position of the trigger 153 break this control circuit and hence through instrumentalities later described renders the tip inoperative. Release of this button will be effective to close the circuit to the main switch thus placing the tool in or out of operable condition in accordance with the position of trigger 153 but not rendering it actually operative except when the trigger is in operative position.

A lead 170 extends from plug 171, which corresponds to plug 58 as previously described and is connectible to jack 107, to a connection with pin 143 and through spring 142 with operating wire 140. A plug 172 is in series with this lead so that if desired a clamp such as 115 previously described in connection with Figure 1 may be employed instead of clamp 134 in such cases as the stirrups making up that clamp are made removable. A lead 173 extends from a plug 174, which is connectible to jack 108 and corresponds to plug 76 previously described, to pin 152 and hence an electrical connection with thrust rod 146 and the electrode tip.

It is to be understood that the electrical arrangements of Figure 20 may be employed if desired instead of those of Figure 19 so that a ballast resistance or a transformer may be used at will.

By reason of the above construction it will be evident that a user normally employs this embodiment of my invention in the manner previously described, operation of trigger 153 automatically closes the circuit to the soldering or welding instrumentalities when a work piece is clamped in position and the electrode advanced and automatically breaks that circuit as the elements of one clamp and the electrode are retracted. If, however, a user wishes to break this circuit before he removes the tip from contact with the work piece as to prevent arcing he may readily do so by using the thumb upon the hand with which he holds the tool to depress button 164 which thereupon operates switch 163 instantly to break the circuit feeding switch 158. As he releases this button this circuit is closed and the work circuit is thereupon placed under the control of the automatic elements of the tool, the work circuit being closed if the tip is in contact with the pieces to be joined and being opened if the tip is not in such contact.

This form of my invention may be constructed with a barrel as well as handle of an electrically non-conducting material such as one of the stronger plastics, for example. In that case insulating tubes such as 141 and 147 are omitted.

The control mechanism shown in Figure 6 may be substituted for that of Figure 1 and other substitutions also may be made, all as later explained.

As previously made clear an important element of my invention is the provision of a novel soldering tool which may be lengthened or shortened at will and to which noses or other elements which are adapted for particular purposes may readily be added or from which they may be readily taken. Means whereby I may accomplish such ends are shown in Figures 22 to 29 inclusive.

In Figure 21 I illustrate such features of my invention by a sketch which shows a butt or handle H to which may be detachably connected a flexible nose F, such as that shown in Figure 1 but detachable, a rigid nose R, such as that shown in Figure 6 but detachable, an extender E having the characteristics described below, which may be disposed between a handle such as H and any other element either another extender or a flexible nose F or a rigid nose R generally indicated in this sketch as X. The tool may be fed either from a transformer indicated as T or a circuit with ballast indicated as B and an alternative lead attached to clamp 115. It will also be understood that nose R or F may take any of the alternative forms shown and described hereinafter or hereinbefore. Each of these units terminates in connective mechanism generally designated as M or N and described in detail hereinafter.

For purposes of illustration in Figures 22 and 23 and in 27 and 28 I show two connecting elements generally designated for convenience as M and N which are about to be joined and in Figures 24, 25 and 26 I show the same connectors after they have been joined. These connecting elements may be the forward end of a main or operative portion of one of my pistols on the one hand and on the other the cooperating rearward end of an extended or a rigid or a flexible nose or one of a special rigid shape. In fact any one of many combinations may be employed. In previous and later portions of this specification the exact relation between these connectors and the structure of the respective embodiments hereof is clearly pointed out.

An outer barrel 186 of connecting element M may carry a set screw 183 which is disposed in a slightly depending terminal extension 184 adjacent its end which is to be joined. This screw cooperates with an offset slot 185 which is formed in a forward section of an outer barrel 182 of element N. By reason of this construction it will be seen that as these two elements are placed together out of alignment in cross section as is indicated by Figures 27 and 28 and given a small turn they will engage and upon the tightening of set screw 183 will be firmly locked in position, the offset portion of slot 185 cooperating to prevent the two pieces from slipping apart.

A thrust rod 187, the longitudinal axis of which is identical with that upon which elements M and N are turned when they are joined or separated, in element N may be formed with an irregularly shaped pointed portion 188 facing element M with which it is to be joined, this portion having an annular holding depression 189 formed between its point and the body of the thrust rod. A corresponding thrust rod 190 in element M may be formed with a spring 191 riveted or otherwise fixedly joined thereto. This spring is formed with or has attached to it a depending head 192 adapted to cooperate with annulus 189. As the two elements are brought together it will be understood that the point of rod 187 causes the spring 191 to ride over portion 188 until its head 192 drops into position in the annular depression 189 whereby it holds the two thrust rods in firm engagement. Rotational movement of the two elements after joining or precedent to separation does not affect this operation since it is carried out upon the longitudinal axis of the tool as a whole with which these rods generally coincide.

Since the wires which control the movable stirrup are not rotated upon their own axes, however, preparatory to a joining or separating operation, a different type of construction must be used. Wire 194 of element N which operates a movable clamp carries an attaching block 195 of irregular shape which operates within an irregularly shaped opening 196 which is formed in an insulating abutment 197 in element N. Attaching block 195 is formed with a forward face 198, a diagonal face 199 and an abutting face 200. Opposite the rightward end of the diagonal face opening 196 is enlarged at 196' to accommodate the cooperating formation of element N. A correspondingly formed block 201 is attached to wire 202 and works within an irregularly shaped opening 203 in an insulating abutment 204 in element M. The faces of this block and the enlargement 203' of this opening which correspond to those previously described for element N are designated by corresponding reference numerals with a prime character added.

When the two structures above described are brought together for engagement and before one has been turned to lock it into position with the other it will be understood that the two formations are held out of alignment cross sectionally considered. As one of the elements is rotated the two diagonal faces 199 and 199' engage each other with faces 198 and 200' and 200 and 198' likewise in engagement.

When one of the elements is rotated relatively to the other, the respective pairs of parts will slide over each other until they assume the positions shown in Figures 25 and 26. The previously recited enlargements permit this sliding operation to take place but are so restricted in relation to adjacent portions of the blocks that during longitudinal operational movement they are retained in relatively fixed relation to each other. By reason of this construction it will be readily understood that longitudinal movement of wire 202 will be communicated to wire 194. On the other hand rotational movement of the two elements in a contrary direction to that which is employed when the two members were joined will immediately unlock them and permit one element to be removed from the other.

While the above means for joining two of the elements of my tool are particularly effective, I am not limited thereto for other desired and practicable devices may be employed. Also, I wish it understood that the above novel and effective means may be applied to joining other objects.

As is shown in Figures 29 and 30 I may embody my invention in a tool, shown as non-adjustable, which is somewhat more simple and rigid than that previously described and in which the contact is automatically and necessarily struck as soon as the tip is moved into contact with the work piece. It differs from the form of the invention shown in Figures 1 and 6 in that one instrumentality closes, and alternately opens, the clamp and another independent thereof operates the tip. Both, however, are so placed that they may be simultaneously operated by one hand which holds the tool. As shown, this embodiment of my invention is constructed of a non-metallic electrically non-conductive substance such as one of the heavier plastics, but it may be made of metal and electrically non-conductive tubes employed as previously described.

From a handle 221 preferably shaped as is the butt of a pistol a barrel 222 extends forwardly. An extension 223 protecting the tip may be formed integrally therewith or may be separate. A clamp generally indicated as 224 is formed by a fixed stirrup 225 which is firmly attached to a forward portion of the barrel and a movable stirrup 226 which is attached to a control rod 227 which extends backwardly within the barrel and works within a suitably formed channel 228. The rear or leftward end of this rod is bent at right angles and as by a pin 229 working in a small arcuate slot not shown in a shield-shaped grip 230 is attached thereto for operation thereby. This shield is formed and disposed somewhat as a safety grip of a pistol and pivoted to the handle or butt as at 232. By reason of this construction it will be evident that when by squeezing his palm the user forces this safety grip toward the butt the clamp is closed. A spring 233 housed in a recess 234 in the handle 221 returns the grip 230 to the non-clamping position when such pressure is released.

An electrode tip 235 is attached preferably in the manner previously described and illustrated in Figure 15 to a metal thrust rod 236 which at its leftward or rearward end is formed with a collar 239 which holds in position a retractor compression spring 240 which when uncompressed forces the tip to its inoperative position as shown in Figure 29. To move the tip into contact with its work piece an L-shaped link or slide 242 extends from a collar 239 to a pin 243 which connects it to a trigger 244 pivoted as at 245 to butt 221. This slide is guided by suitable means not fully shown. By reason of this construction it will be evident that as trigger 244 is pulled the tip will be advanced into contact with the work piece. Previously, however, a user by pressure of this palm has moved the clamp to closed position.

As previously indicated in connection with Figures 1 and 6 hereof this form of my invention may include the interchangeable features generally indicated by Figure 21 and described in detail in connection with Figures 22 to 28 both inclusive. In that instance barrel 222 and the parts therewithin are terminated at approximately the point indicated by the arrow placed above the barrel in Figure 29, the portion of the device immediately to the right of the arrow corresponding to connecting element N and that to the left corresponding to connecting element M of the foregoing figures. Thrust rod 235 thereupon is constructed in two parts corresponding to rods 187 and 190 and wire 227 in two parts which correspond to wires 194 and 202. It will be understood that owing to such construction a flexible nose, an extender or any special nose which is desired may be added to the barrel and control mechanism which is discussed hereinabove in connection with Figure 29.

The electrical arrangements of this form of my invention may be simple. A lead 247 attached to the fixed stirrup is extended to a main through a suitable connector not shown. Similarly a lead 248 is attached to thrust rod 236 and through a ballast resistance 250 likewise extends to the main. Alternatively of course a transformer may be employed.

I prefer, however, to employ the electrical system shown by Figure 31 (sheet three) particularly when a transformer is used or to make the tool adaptable for use either with a ballast resistance or a transformer.

A switch 253 similar to a safety catch upon an automatic pistol is attached to a part of the exterior of butt 221 where it may be easily reached by the thumb of the hand of a user. Through leads 254 and 255 it is attached to plugs 256 and 257 respectively corresponding to plugs 88 and 86 of Figures 1, 19 and 20. Lead 247 extends from stirrup 225 and lead 248 from tip 235 to plugs 258 and 259 respectively corresponding to plugs 76 and 58 respectively of the above figures. Switch 253 serves as a master for controlling the operation of the tool as do the switches illustrated in Figures 19 and 20 previously described. The plugs described above cooperate with the jacks of Figure 19 or alternatively with those of Figure 20 so that this embodiment of my invention may be utilized as previously described either with a transformer or ballast resistance. If desired, however, the electrical switching arrangements of Figures 6 or 32 may be applied to this embodiment.

In the embodiment of my invention shown in Figures 32 and 33 a hand-hold resembling a safety grip of a pistol is employed both to close a clamp and to move the tip from and to operative relation while a trigger-controlled switch closes and opens the work circuit. The mechanism for working the various parts is preferably housed in four chambers as will be apparent at the conclusion of the following description. An important feature of my invention which I illustrate as applied to this form is a lock for the clamp, likewise operable by the one hand of a user who operates this pistol, whereby the work pieces which are to be joined may be retained as in a vise, before or after having been joined.

A handle or butt 271 preferably shaped as previously described supports a forwardly extending barrel 272 in the forward or work end of which are mounted preferably as previously described either permanently or interchangeably a fixed stirrup 273 and a movable stirrup 274. Movable stirrup 274 is attached to or formed as a part of a thrust rod 275 which at its forward end carries two collars 276 and 277 fixed thereon and a rearwardly extending reduced portion 278. This reduced portion extends within a cooperatingly placed axial bore 278' in a movable operating tube 279. A retractor plate 280 having a forward upstanding ear or fork 281 with an opening through which rod 275 freely moves as limited by collar 276 and a rearwardly upstanding ear 282 firmly attached to tube 279 for movement therewith holds in place a relatively heavy spring 283 which is loosely movable between ear or fork 282 and collar 277. When the tool is in the inoperative position of Figure 32 this spring is entirely relaxed. An irregularly formed motion-transmitting plate 285 having an upstanding formation 286 is operatively attached to tube 279. This upwardly extending formation, which is in the form of a flat plate, working through a guiding slot 287 operates the tip in a manner later described. By a control pin 289 working in a slot this plate is attached to a grip 290 similar to a safety grip upon a pistol which is pivoted at 291 within handle 271. A compression spring 292 urges this structure to the position shown in Figure 32.

Tip 293 is mounted, preferably in a manner similar to that previously described, indicated at 294 to the forward end of thrust rod 295 at the rearward end of which a collar 296 is so positioned as to be engaged by formation 286 which is operated concomitantly with control tube 275 as previously described. A compression spring 297 working between collar 296 movable with the thrust rod 295 and a fixed collar 298 is operative to return the thrust rod and tip to the position shown in Figure 32 when a user relaxes his pressure upon grip 290. This collar is part of a partition extending across the barrel and forming an inner vertical boundary between work chambers of the tool.

By reason of this construction as a user squeezes safety grip 290 he moves the previously described clamp-controlling structure toward operative position. Motion transmitted through spring 280 will advance rod 275 and stirrup 274 toward the pieces of metal to be joined and fixed stirrup 273. Formation 286 will engage collar 296 of thrust rod 295 and will advance the tip to operative position. Whatever additional movement is required of the above described control mechanism in order so to advance this tip will be supplied by further compression of springs 280 and 297 with no action other than to apply a further and desirable pressure to the metal parts being held.

When a user releases his pressure upon grip 290 spring 292 with the cooperation of springs 297 and 283 will force the structure to the position shown in the drawings thereby retracting the tip and opening the clamp. As the result of this operation fork 281 will engage collar 276 and move stirrup 274 away from stirrup 273 and to its inoperative position. It will be understood that this operation takes place after spring 283 has become completely relaxed. It is particularly to be noted that I do not employ opposed spring pressure and neither do I rely upon springs of different magnitudes. Springs which I employ here assist each other in the opening operation but such function is incidental. The purpose of spring 283 is to permit further movement of the control structure after the clamp has been closed. This arrangement is made necessary because the movable stirrup and the tip must be moved different distances to accommodate work pieces of different sizes.

As previously stated in connection with the other forms by which I illustrate my invention I may arrange this barrel so that different nose pieces may be used or an extender added.

Tip 293 is fed by a lead 299 extending from collar 296 which is electrically connected to the tip to plug 300 while fixed clamp 273 is supplied by a lead 301 extending to plug 302 and if desired having in series a plug 303 for the purposes previously described in connection with such a clamp 115 as that shown in Figure 1. Plugs 304 and 305 through leads 306 and 307 feed a conventional quick acting heavy duty micro-switch 308. Since plugs 302, 300, 304 and 305 respectively correspond to 58, 76, 86, and 88 respectively previously described it will be understood that the electrical arrangements in this form of my apparatus are the same as those previously described in detail and illustrated in Figures 1 and 19 and 20.

Non-conductive tubing, such as that previously described, is employed.

To operate this switch I preferably employ a trigger although if desired I may omit a trigger and operate the switch by a connection with grip 290. A trigger plate 310, guided by means not shown, preferably formed of non-conducting material and placed within a guard 311 includes a foot 312 which bears against switch button 313. The trigger is urged to inoperative position by a compression spring 314.

By reason of this construction it will be seen that a user has complete and independent control of the work circuit by means of this trigger and may apply high heat at the moment which he wishes and maintain it operative for whatever length of time he may wish.

For purposes of illustration only I apply that phase of my invention wherein I retain the clamp in closed position to this embodiment of my invention. It will be readily understood, however, that I may apply it to any other embodiment.

As illustrated in Figures 32 and 33 I provide a clamp which holds tube 279 and hence movable stirrup 274 against unwanted retraction from any position to which it has been advanced yet does not interfere with any advancing movement. This clamp is so arranged that it may be put into or out of operation instantly by a single movement of one finger of a hand which is holding and using this tool.

This clamp comprises an annular holding or latching member 315 having a central opening 316 loosely surrounding tube 279 and having an ear downwardly extending from its annular portion and pivoted upon a pin 317. A compression spring 318 surrounding this tube tends to move the clamp to the position shown in the drawings. This spring extends between holding member 315 and fixed collar or cross partition 298. This ear of the holding member is extended into a relatively wide and long offset finger piece 320 which is so placed that it extends within the cross sectional area of the finger guard 311 near the top thereof and can easily be operated by the finger of an operator by which he operates the trigger. Upon movement to its extreme upward position as shown in Figure 32 this finger piece engages spring catch 321 thus rendering the clamp inoperable.

From the above description it will be seen that when the clamp is in operable position as a user moves stirrup 274 toward stirrup 273 the blocking member will offer no material resistance but that any backward or opening movement will be blocked by engagement of the tube with the inner surface of the annulus of the spring pressed clamp as it tilts into a camming position. A touch of an operator's finger, however, will instantly release this clamping action or will throw the clamp completely out of operation.

It will be understood from a consideration of the previous portion of this specification and an examination of Figure 32 that this form of my tool includes what may be aptly described as four work chambers. A first 325, through which thrust rod 295 operates, is bounded on the left as viewed in Figure 32 by collar 298 and the cross partition of which it is a part through which the rod extends. This partition forms the vertical boundary as viewed in Figure 32 between this first chamber and a second chamber 326 which houses operating spring 297 for this thrust rod and into which operating formation 286 extends through an opening 287 from a third operating chamber 327. This third chamber is largely disposed within the butt 271 and extends forwardly over the trigger guard 311. A fourth operating chamber 328 serves as a housing for operating rod 275, which passes through it, and the transmission mechanism connected thereto. It is terminated on the left as shown in Figure 32 by partition 298 which also serves as a collar for spring 318.

The advantages of my invention will have been made apparent from the foregoing portion of this specification, the attached drawings and the sub-joined claims. They are embodied in a plurality of thermal metal-joining tools whereby work pieces are clamped into position and joined to each other as by soldering, welding or brazing by the application only to the work area and for an instant only of heat of very high temperature but necessarily under optimum conditions and without danger of injury to work or worker.

I claim:

1. In a hand metal-joining tool, a butt, a barrel, a first end of which is attached to and extends from said butt, a clamp for a work piece movable in the second end of said barrel opposite that which is attached to said butt in relation thereto, a first electrode partially housed within said barrel adjacent its second end and movable along its longitudinal axis to a position wherein it is projected without said barrel, a second electrode fixed adjacent said second end of said barrel and so disposed as to cooperate with said clamp and a work piece held thereby and said first or movable electrode when it is so projected from said barrel, an actuating member upon said butt, a circuit including said first and second electrodes, an operating connection extending within said barrel between said actuating member and said first or movable electrode for moving said first electrode by the movement of said actuating member, and means independent of said actuating member for operating said movable clamp.

2. In a hand thermal metal-joining tool, a butt, two actuating members independent of each other attached to said butt and so disposed thereon as to be operable by different parts of a hand of a user as he grasps said butt, a barrel one end of which is attached to said butt and extends forwardly therefrom, a clamping member movable relatively to the forward end of said barrel, an electrode tip mounted upon said barrel and separate from said clamp and movable in respect to a work piece engaged by said clamping member, and separate linkage between each of said actuating members and said clamping member and said electrode tip respectively for selectively operating each thereof.

3. In a hand thermal metal-joining tool, a butt, a barrel extending forwardly from said butt, a clamping member mounted upon the forward end of said barrel and movable relatively thereto, an electrode tip mounted within said barrel and extensible forwardly therefrom into engagement with a work piece which is engaged by said clamp, a trigger mounted upon said butt for engagement by a finger of a hand of a user who grasps said butt, a grip mounted upon said butt for movement relatively thereto under pressure of the palm of said hand, linkage between said grip and said movable clamp for operating said movable clamp by said grip, and linkage between said trigger and said electrode for moving said electrode in relation to a work piece engaged by said clamp upon movement of said trigger.

4. In a hand thermal metal-joining tool, a butt, a barrel one end of which is attached to said butt and extends forwardly therefrom, a movable electrode tip disposed adjacent the forward end of said barrel, a movable clamping member disposed adjacent the forward end of said barrel and in cooperative position relative to said electrode, a first thrust rod attached to said electrode tip and extending backwardly therefrom along the longitudinal axis of said barrel, a second thrust rod attached to said movable clamping member and extending backwardly therefrom along the longitudinal axis of said barrel generally parallel to said first thrust rod, a trigger mounted upon said butt and extending forwardly therefrom for operative movement backwardly and toward said butt, a grip movably mounted upon said butt and extending backwardly therefrom for operative movement forwardly and toward said butt, a first operating connection between said trigger and one of said thrust rods, and a second operating connection between said grip and the other of said thrust rods, whereby a user who grasps said butt may selectively operate said clamping member and said electrode tip without removing his hand from the tool.

5. In a hand thermal metal-joining tool, a butt, a barrel extending forwardly from said butt, an electrode tip within said barrel for movement along its longitudinal axis, said tip terminating rearwardly in a thrust rod, a collar upon the rearward end of said thrust rod, a tubular formation within the forward end of said barrel and encircling said electrode tip, a compression spring between said collar and the rearward end of said formation, said spring normally moving said thrust rod and hence said electrode tip into inoperative position toward the rear of said barrel, a trigger mounted upon said butt, and a link between said trigger and said collar for advancing said thrust rod and hence moving said tip against the power of said spring to operative position upon the compression of said trigger.

6. In a hand thermal metal joining tool, a butt, a barrel one end of which is supported thereby and extends forwardly from said butt, a movable electrode tip mounted in the forward end of said barrel and extensible therefrom, a thrust rod connected to said tip and extending backwardly therefrom through said barrel and along the longitudinal axis thereof, a compression spring forcing said thrust rod backwardly along said barrel thereby moving said tip to inoperative position, a trigger mounted in said butt and extending forwardly therefrom, said trigger being pivoted in said butt and having an upward extension, an operating link, one end of said link extending to a position behind the rearward end of said thrust rod, and a pin and slot connection between said extension of said trigger and said operating link whereby the movement of said trigger backwardly upon its pivot moves said thrust rod and said electrode tip forwardly.

7. In a hand thermal metal-joining tool, a butt, a barrel one end of which is attached to said butt and extends forwardly therefrom, a movable clamping member disposed adjacent the forward end of said barrel, a thrust rod attached to said movable clamping member and extending backwardly therefrom along the longitudinal axis of said barrel therewithin, a grip movably mounted upon said butt and extending backwardly therefrom, and an operating connection between said grip and said thrust rod, whereby a user who grasps said butt may move said thrust rod forwardly against the power of said spring thereby operating said clamping member without removing his hand from the tool.

8. In a hand metal-joining tool, a butt, a barrel extending from said butt, said barrel including two channels therewithin parallel to the longitudinal axis of said barrel and extending away from said butt toward the end of said barrel relatively distant from said butt, a first motion-transmitting member extending within one of said channels therewithin and movable therealong in one direction, a clamp attached to said member beyond the end of said channel relatively remote from said butt and movable with said member toward said butt, means adjacent the end of said barrel against which said clamp holds a work-piece upon such movement of said clamp, a second motion-transmitting member extending through the other of said channels away from said butt toward the end of said barrel relatively remote from said butt and movable therealong in a direction opposite that in which said first mentioned member is movable, an electrode disposed upon the end of said second member relatively remote from said butt and movable by said member from and to a position within the end of said second mentioned channel for engaging a work-piece held by said clamp and said means, an actuating member disposed upon said butt, a switch for rendering said electrode electrically operative, and instrumentalities connecting said actuating member said switch and said motion-transmitting members for operating all thereof.

9. In a hand metal-joining tool, a butt, an actuating member upon said butt, a barrel extending from said butt, two motion-transmitting members extending from said actuating member along said barrel away from said butt and movable along the optical axis of said barrel parallel to each other and to the longitudinal axis of said barrel, connections between said actuating member and said motion-transmitting members for moving said motion-transmitting members in opposite directions by the movement of said actuating member, means mounted upon the ends of each of said motion-transmitting members relatively remote from said butt and extending without said barrel adjacent its end for engaging and pressing against opposite sides of a work-piece, and means including a member independent of said means which engage said workpiece for passing an electrical current through said work-piece when it is so engaged.

10. In a hand thermal metal-joining tool, a butt, a movable electrode, a barrel for supporting said electrode largely therewithin, one end of said barrel being supported by said butt and the other thereof supporting and protecting said electrode, an actuating member upon said butt, sequential control linkage between said actuating member and said electrode for advancing said electrode by the movement of said actuating member along the longitudinal axis of said barrel and from said barrel to a position partially therewithout, and operable means for applying an electrical current to said electrode only after it has been so advanced, said means comprising a circuit including said electrode and a switch for said circuit operatively interconnected to said linkage and actuated by the movement thereof.

11. In a hand thermal metal-joining tool, a butt, a movable electrode, a barrel for supporting said electrode largely therewithin, one end of said barrel being supported by said butt and the other thereof supporting and protecting said electrode, an actuating member upon said butt, a circuit including said electrode, a switch for said circuit, and sequential control linkage having one component operatively interconnecting said actuating member and said electrode and another and separate component operatively interconnecting said actuating member and said switch respectively for moving said electrode by the movement of said actuating member along the longitudinal axis of said barrel between a protective position largely within said barrel and an operating position wherein it extends therefrom and concomitantly operating said switch.

12. In a hand thermal metal-joining tool, a butt, a movable electrode, a barrel for supporting said electrode, one end of said barrel being supported by said butt and the other end thereof supporting said electrode; said electrode being normally disposed entirely within said barrel whereby it is completely protected thereby when not in use, an actuating member upon said butt, a connection between said actuating member and said electrode housed within said barrel for advancing said electrode by the movement of said actuating member along the longitudinal axis of said barrel and from said barrel to a position whereby the leading end thereof is disposed therewithout, and a switch operatively connected to said actuating member and operated thereby for applying an electrical current to said electrode after it has been so advanced.

13. In a hand thermal metal-joining tool, a butt, a movable electrode, a barrel for supporting said electrode, one end of said barrel being supported by said butt and the other end thereof supporting said electrode, said electrode being normally disposed in a first position entirely within said barrel wherein it is protected thereby when not in use, an actuating member upon said grip, a connection between said actuating member and said electrode for alternatively advancing said electrode along the longitudinal axis of said barrel to a second position wherein the leading end thereof is disposed without said barrel and for retracting said electrode to said first position, an electrical circuit one leg of which includes said electrode, a switch for breaking said circuit, and an operating connection between said switch and said actuating member for rendering said electrode electrically inoperative when said electrode has been so retracted to said first position within said barrel.

14. In a hand thermal metal-joining tool, a butt, a barrel extending forwardly from said butt, a clamp comprising a relatively fixed member and a member movable relatively thereto, an electrode tip separate from said clamp and movable in respect thereto, said clamp being mounted upon the end of said barrel relatively remote from said butt, a circuit including said electrode tip and one member of said clamp, a first actuating member upon said butt, linkage between said first actuating member and said movable member of said clamp and said electrode tip for moving each thereof to operative position, a second actuating member upon said butt and an operating element operated by said second actuating member for closing said circuit independently of the operation of said clamp and the advance of said electrode tip, both of said actuating members being so disposed upon said butt that they may be selectively operated by a hand of a user as he grasps said butt.

15. In a hand thermal metal-joining tool, a butt, a barrel supported upon said butt and extending forwardly therefrom, a movable electrode tip housed in the end of said barrel relatively distant from said butt, a first thrust rod for operating said tip attached thereto and movable along the longitudinal axis of said barrel, a clamp, said clamp including a fixed member and a member movable relatively thereto positioned at said end of said barrel relatively remote from said butt and adapted to hold a work piece in position for engagement by said electrode tip, a second thrust rod attached to said movable member of said clamp, a movable grip disposed upon said butt and engageable by the palm of a hand of a user of said tool, a trigger mounted upon said butt and engageable by a finger of said hand, an operative connection between said second thrust rod and said grip for operating said movable member of said clamp by the movement of said grip, said connection including a lost motion device, a formation mounted upon said connection for moving said first thrust rod upon a portion of the movement of said grip following the primary portion which operates said movable clamping member, a releasable detent movable from and to a position where it engages said second thrust rod to hold said movable member of said clamp in clamping position, an electrical circuit including one member of said clamp and said electrode tip, a switch for said circuit, and a connection between said trigger and said switch for operating said switch upon the movement of said trigger.

16. In a hand thermal metal-joining tool, a butt, a barrel mounted upon said butt and extending forwardly therefrom, a clamp mounted upon said barrel adjacent the forward end thereof, said clamp having a fixed member and a member movable relatively thereto, an actuating member upon said butt for moving said movable member of said clamp to holding relation to said fixed member of said clamp and a work piece therebetween, a circuit including said clamp for applying an electrical current to the work piece held thereby, operable means independent of said actuating member for alternatively making and breaking said circuit, and a releasable detent for holding said clamp in closed position after said circuit has been broken.

17. In a hand thermal metal-joining tool, a butt, a barrel supported upon said butt and extending forwardly therefrom, an operable clamp disposed in the forward end of said barrel, said clamp comprising a fixed member and a movable member, a movable grip mounted upon said butt and projecting therefrom and so positioned as to be operable by the palm of a hand of a user of the tool, linkage between said movable clamping member and said grip, a releasable detent movable to a position wherein it engages said linkage to hold said movable member in clamping position, an actuating member for said detent so disposed as to be operable by a finger of a hand of a user of said tool while he is grasping said butt so that he can operate said grip, and means operable independently of said detent and said grip for alternatively making and breaking an electrical circuit including said clamp and a work piece held thereby independently of the position of said detent member.

18. In a hand thermal metal-joining tool, a butt, a barrel extending forwardly from said butt, a clamp disposed upon the forward end of said barrel, said clamp including a fixed and a relatively movable member, a circuit which includes said clamp and a work piece held thereby, a switch for said circuit, a detent engaging said movable clamp for holding it in closed position once it has been moved thereto, and three actuating members all disposed upon said butt in positions wherein they can be reached by members of the hand of a user as it grasps said butt, a connection between said first of said actuating members and said movable member of said clamp, an operative connection between a second of said actuating members and said switch and a connection between the third of said actuating members and said detent for rendering it operative and inoperative, whereby a user may selectively move said clamp to closed position and hold it there or release it therefrom and make and break said circuit without removing his hand from said butt.

19. In a hand thermal metal-joining tool, a butt, a barrel extending forwardly therefrom and supported thereby, operable means disposed adjacent the forward end of said barrel for clamping a work piece in working position, said means including a circuit, a switch for said circuit, a trigger guard extending between said butt and said barrel, a trigger within said guard so disposed in relation to said switch that the movement of said trigger operates said switch alternatively to make and break said circuit, a releasable detent for holding said operable means in clamping position, and an operating member of said detent projecting within said trigger guard wherein it may be operated by a finger of a user of said tool as he holds said tool in his hand in position to operate said trigger.

20. In a hand thermal metal-joining tool, a butt, a barrel extending forwardly from said butt, an electrode movable in said barrel along the longitudinal axis thereof from a point largely within said barrel to one therewithout, a clamp, said clamp comprising a fixed member and a member movable relatively thereto both disposed adjacent the end of said barrel opposite that adjacent said butt, a grip movably mounted upon said butt and extending to the exterior thereof to a position wherein it may be grasped and moved by the palm of a hand of a user, linkage between said grip and said movable member of said clamp and said electrode for concomitantly moving said movable member to closed position and moving said electrode to its operable position outside of said barrel, a trigger mounted upon said butt independently of said grip, an electrical circuit including said clamp and said electrode, a switch for said circuit, and a connection between said trigger and said switch for operating said switch by the movement of said trigger.

21. In a hand thermal metal-joining tool, a butt, a barrel extending forwardly from said butt, an electrode tip disposed in the forward end of said barrel, a first thrust rod extending backwardly from said electrode tip toward said butt, a movable clamp projecting forwardly from the end of said barrel adjacent said tip, a second thrust rod for operating said movable clamping member, a grip movably disposed upon said butt and so positioned that it can be grasped by the palm of the hand of a user of said tool, a connection between said grip and said second thrust rod for operating said clamp upon the movement of said grip, and a motion transmitting formation extending from said connection to a position wherein it engages said first thrust rod after said second thrust rod has been advanced to a position wherein it operates said movable clamp for operating said first thrust rod for advancing said electrode tip after the closing of said clamp, said second thrust rod being provided with a lost motion device which permits such operation.

22. In a hand thermal metal-joining tool, a butt, a movable electrode, a circuit which includes said electrode, a switch in said circuit, a barrel for supporting said electrode, one end of said barrel being supported by said butt and the other end of said barrel supporting and largely housing said electrode, a clamp for a work piece mounted by said barrel adjacent said operating position of said electrode, an actuating member upon said butt, a first connection between said actuating member and said electrode for advancing said electrode from the end of said barrel in a direction along its longitudinal axis by the movement of said actuating member, and a second connection between said actuating member and said switch for closing said switch when said electrode is advanced thereby making possible the application of an electrical current thereto.

23. In a hand thermal metal-joining tool, a support, an electrode mounted by said support for longitudinal movement to and from an operating position, an electrical circuit one leg of which includes said electrode, a switch for said circuit, a clamp on the support and in said circuit adapted to apply the other leg of said circuit to a work piece and simultaneously hold the work piece adjacent the operating position of said electrode in operative relation with said electrode, a hand operated actuating member separate from said switch and mounted upon said support to be movable at will between an operative and an inoperative position for controlling said tool in the manner desired, and sequentially operating linkage between said actuating member and said electrode and said switch which upon the first portion of the movement of said actuating member from its said inoperative toward its said operative position moves said electrode longitudinally to its said operating position and upon a second and succeeding portion of said movement closes said switch, whereby said electrode is in operative relation with a work piece before said electrode is electrically active.

24. In a hand thermal metal-joining tool, a butt, a barrel supported by said butt, a clamp mounted upon said barrel, said clamp comprising a relatively fixed member and a member movable relatively thereto, an electrode tip mounted upon said barrel and separate from said clamp and movable in respect thereto, an electrical circuit which includes said tip and one member of said clamp, an actuating member mounted upon said butt, said actuating member being operable at will between an inoperative and an operative position, and sequential timing linkage between said actuating member and said tip and said movable member of said clamp, said linkage passing through the interior of said barrel and having successively effective components which upon a first portion of the movement of said actuating member move said movable clamping member into holding relation to said other clamping member for holding a work piece therebetween and after said work piece has been so clamped and upon a second and succeeding portion of said movement move said tip into contact with the work piece which has been clamped by said previous movement.

25. In a thermal metal-joining tool, a support, a clamp mounted upon said support, said clamp comprising a relatively fixed member and a member movable relatively thereto, an electrode tip mounted upon said support and separate from said clamp and movable in respect thereto, a switch, an electrical circuit which includes said tip and said switch and one member of said clamp, an actuating member mounted upon said support, and sequential timing linkage between said actuating member and said switch and said tip and said movable member of said clamp, said linkage having successively operable components which upon a first portion of a movement of said actuating member move said movable clamping member into holding relation to said other clamping member for holding a work piece therebetween and move said tip into contact with a work piece which has been clamped by such movement and thereafter upon a succeeding portion of said movement close said switch whereby said circuit is rendered active.

26. In a thermal metal-joining tool, a support, a clamp mounted upon said support, said clamp comprising a relatively fixed member and a member movable relatively thereto, an electrode tip mounted upon said support and separate from said clamp and movable in respect thereto, a switch, an electrical circuit which includes said tip and said switch and one member of said clamp, an actuating member mounted upon said support and movable between an inoperative and an operative position, and sequential timing linkage between said actuating member and said switch and said tip and said movable member of said clamp, said linkage having successively operable parts which upon a first portion of a movement of said actuating member from said operative position back to said inoperative position open said switch whereby said circuit is rendered inactive and upon a succeeding portion of such movement move said movable clamping member away from holding relation to said other clamping member and remove said electrode tip from contact with said work piece, said clamping members being in clamping relation to each other and a work piece therebetween and said tip engaging said work piece and said circuit being active when said actuating member is disposed in said operative position.

27. In a thermal metal-joining tool, a support, a clamp mounted upon said support, said clamp comprising a relatively fixed member and a member movable relatively thereto, an electrode tip mounted upon said support and separate from said clamp and movable in respect thereto, a normally open electrical circuit which includes said tip and one member of said clamp, a switch for closing said circuit, and sequential control means, said control means including an actuating member and connective operating mechanism between said actuating member and said tip and said movable member of said clamp and said switch, said connective operating mechanism including instrumentalities which upon a first portion of the movement of said actuating member move said movable clamping member into holding relation with said other clamping member for holding a work piece therebetween and upon a second and succeeding portion of said movement move said tip into contact with a work piece which has been clamped by said previous movement and upon a third and final movement operates said switch to close said circuit.

28. In a thermal metal-joining tool, a support, a clamp mounted upon said support, said clamp comprising a relatively fixed member and a member movable relatively thereto, an electrode tip mounted upon said support and separate from said clamp and movable in respect thereto, a normally open electrical circuit which includes said tip and one member of said clamp, a switch for closing said circuit, and sequential control means, said control means including a trigger and connective operating mechanism between said trigger and said tip and said movable member of said clamp and said switch, said connective mechanism comprising a first and direct linkage between said trigger and said movable member of said clamp which upon a first portion of the movement of said trigger moves said movable clamping member into holding relation with said other clamping member for holding a work piece therebetween, a second linkage between said trigger and said electrode tip which follows a longer path than that of said first mentioned linkage which upon a second and succeeding portion of said movement of said trigger moves said tip into contact with a work piece which has been clamped by said previous movement, and a third linkage between said trigger and said switch for operating said switch at the conclusion of the operation of said second linkage for closing said circuit after said clamp has been closed and said tip brought into operative relation with the work piece.

29. In a hand thermal metal-joining tool, a butt, a barrel extending from said butt, a clamp mounted upon said barrel, said clamp comprising a relatively fixed member and a member movable relatively thereto, an electrode tip mounted upon said barrel and separate from said clamp and movable in respect thereto, a normally open electrical circuit which includes said tip and one member of said clamp, a switch for closing said circuit, said switch having an operating member, a trigger mounted upon said butt, a connection between said trigger and said movable member of said clamp for moving said member to closed position upon a first portion of the movement of said trigger, said connection including a lost motion device whereby further movement of said trigger is without effect upon said movable member of said clamp, an operating arm pivoted within said butt, a connection between said arm and said trigger for rocking said arm upon its pivot by the movement of said trigger, and linkage between one or a first end of said arm and said electrode tip for moving said electrode tip by the rocking of said arm by the further movement of said trigger whereby said electrode is brought into operative contact with a work piece which has been held in position by said clamp, and the other or second end of said arm having a formation which is so disposed that it engages and operates said operating member of said switch upon a final or concluding movement of said trigger thereby completing said circuit.

30. In a thermal metal-joining tool, a butt, a barrel extending from said butt, a clamp mounted upon said barrel relatively distantly from said butt, said clamp comprising a relatively fixed member and a member movable relatively thereto, an electrode tip mounted upon said barrel and separate from said clamp and movable in respect thereto, a normally open electrical circuit which includes said tip and one member of said clamp, a switch for closing said circuit, said switch having an operating member and spring means for normally maintaining it in open position, a trigger mounted upon said butt for movement in a direction generally parallel to the longitudinal axis of said barrel between an inoperative and an operative position, a spring for holding said trigger in inoperative position, a direct connection between said trigger and said movable member of said clamp for moving said member to closed position upon a first portion of the movement of said trigger toward operative position, said connection including a lost motion device whereby further movement of said trigger is without effect upon said movable member of said clamp, a connection extending from said trigger in a direction away from said clamp, said connection being bifurcated at its end remote from said trigger, an operating arm pivoted within said butt, a first portion of said arm extending from said pivot point toward said trigger being bifurcated but of an over-all width less than the over-all width of the bifurcation of said connective link, a stub shaft joining both sets of said bifurcations for rotational movement thereon whereby the movement of said trigger in a direction toward operative position rocks said operating arm upon said pivot, one of said bifurcations being disposed within the cross sectional area of the other thereof, a thrust rod extending from said movable electrode along said barrel to a point adjacent the end of said operating arm other than said previously described bifurcated portion thereof, a spring for normally moving said thrust rod away from said clamp toward inoperative position, a connection between said last mentioned portion of said operating arm and said thrust rod for moving said rod toward said clamp, and a stub arm pivoted upon said stub shaft between said inner bifurcations upon the end of said pivoted arm, one end of said stub arm being so disposed that upon movement of said trigger to operative position it engages and operates said operating member of said switch and the other end of said stub arm having a detent formation which holds said stub arm in operating position as said trigger is moved to operative position but permits free movement thereof when said trigger is moved toward inoperative position.

31. In a hand thermal metal-joining tool, a butt, a barrel one end of which is attached to said butt and extends therefrom, a clamp, said clamp comprising a relatively fixed member and a member movable relatively thereto both of which are supported upon said barrel, an electrode tip, means for mounting said clamp and said tip in alignment at the end of said barrel other than that attached to said butt, a trigger mounted upon said butt, said trigger being movable between an inoperative and an operative position, a first linkage between said trigger and said movable member of said clamp passing within said barrel along the longitudinal axis thereof for closing said clamp by the movement of said trigger, said linkage including a lost motion device, and a separate and second linkage between said trigger and said electrode tip passing within said barrel along the longitudinal axis thereof for advancing said electrode tip to engage a work piece held by said clamp, further movement of said trigger after said clamp has engaged a work piece while operating said second linkage to advance said electrode tip into operative relation with said work piece being without operative effect upon said second linkage and said clamp.

32. In a hand thermal joining-tool, a butt, a barrel one end of which is attached to said butt and extends therefrom, a clamp, said clamp comprising a relatively fixed member and a member movable relatively thereto, an electrode tip mounted upon said barrel and separate from said clamp and movable in respect thereto, an electrical circuit which includes said tip and one member of said clamp, and sequential control means, said control means including a trigger mounted upon said butt and linkage between said trigger and said electrode tip and said clamp for operating both thereof, said trigger being movable between an inoperative and an operative position, a part of said linkage between said trigger and said clamp including a lost motion device whereby after the engagement of a work piece by said clamp further movement of said trigger to advance said electrode is without effect upon said clamp.

33. In a hand thermal metal-joining tool, a support, an electrode mounted by said support for longitudinal movement to and from an operating position, an electrical circuit one leg of which includes said electrode, a switch for said circuit, a clamp on the support and in said circuit adapted to apply the other leg of said circuit to a work piece and simultaneously hold the work piece adjacent the operating position of said electrode in operative relation with said electrode, a hand operated actuating member separate from said switch and mounted upon said support to be movable at will between an operative and an inoperative position for controlling said tool in the manner desired, and sequentially operating linkage between said actuating member and said electrode and said switch which upon the first portion of the movement of said actuating member from its said operative toward its said inoperative position causes said switch to open and upon a second and succeeding portion of said movement removes said electrode longitudinally from its said operating position, whereby said circuit is broken before said electrode can be removed from operative relation with the work piece.

34. In a hand thermal joining tool, a butt, a barrel one end of which is attached to said butt and extends therefrom, a clamp, said clamp comprising a relatively fixed stirrup and a stirrup movable in relation thereto, an electrode tip, means for mounting said stirrups and said tip in alignment at the end of said barrel other than that attached to said butt, a work circuit including said electrode tip and one of said stirrups, and a sequential control mechanism, said control mechanism including an actuating member and connections between said actuating member said circuit said movable stirrup and said tip and including instrumentalities for first operating said movable stirrup to move said clamp to clamping position, second for advancing said tip into contact with pieces of metal which have been clamped between said stirrups, and third for closing said circuit whereby said metal is heated.

35. In a thermal metal-joining tool, a support, an operable clamp for holding a work piece upon said support, said clamp including an electrode, a separate and movable electrode, means for moving said separate electrode into operative relation with a work piece which has been held by said clamp, a switch, a circuit including said electrodes and said switch, an actuating member, and sequential linkage operatively interconnecting said actuating member and said clamp and said switch, said sequential linkage comprising a first component which first moves said clamp to operative position and a second component which thereafter operates said switch to close said circuit.

36. In a thermal metal-joining tool, a support, an operable clamp movable to and from an operative position wherein it holds a work piece in fixed relation to said support, said clamp including an electrode, a separate electrode movable to and from operative relation with a work piece which is held by said clamp, an actuating member movable to and from an operative position, and sequential operating linkage operatively interconnecting said actuating member and said clamp and said movable electrode, said sequential linkage comprising a first component which upon the first portion of the movement of said actuating member from said operative to said inoperative position withdraws said clamp from operative position and a second component which upon a succeeding portion of the movement of said actuating member from said operative to said inoperative position retracts said movable electrode.

37. In a hand thermal metal-joining tool, a support, an electrode mounted by said support for longitudinal movement to an operating position for contact with a work piece and for longitudinal movement away from said operating position, a clamp for a work piece mounted by said support adjacent said operating position of said electrode, a normally open electrical circuit which includes said electrode, a switch for closing said circuit, said switch being spring-pressed to open position, and sequential control means, said means including a hand operated actuating member separate from said switch and mounted by said support for movement between an operative position and an inoperative position and sequentially operating linkage operatively interconnecting said actuating member and said electrode and said switch, said linkage including one component which, after said switch has been closed and said circuit has been made and said electrode is at its said operating position in contact with a work piece, upon movement of said actuating member from its said operative position toward its said inoperative position first releases said switch which breaks said circuit and another component which maintains said electrode in physical contact with said work piece until said switch has been released and thereafter moves said electrode longitudinally away from said work piece.

38. In a thermal metal-joining tool, a clamp comprising a relatively fixed member and a member movable relatively thereto, an electrode tip separate from said clamp and movable in respect thereto, a mount for said tip and said clamp, a normally open electrical circuit which includes said tip and said clamp, a switch for closing said circuit, and sequential control means, said means including an actuating member and mechanism operatively interconnecting said actuating member and said tip and said movable member of said clamp and said switch, said connections including instrumentalities which after said clamp has been closed and said circuit has been made and said tip moved into contact with a work piece held by said clamp first break said circuit and thereafter remove said movable member from said fixed member thereby opening said clamp and removing said tip from said work piece.

39. In a thermal metal-joining tool, a clamp comprising a relatively fixed member and a member movable relatively thereto, an electrode tip separate from said clamp and movable in respect thereto, a mount for said tip and said clamp, a normally open electrical circuit which includes said tip and one member of said clamp, a switch for closing said circuit, and sequential control means, said control means including an actuating member and connections between said actuating member and said tip and said movable member of said clamp, said connections including instrumentalities which upon a first portion of the movement of said actuating member move said movable clamping member into holding relation with said other clamping member for holding a work piece and upon a second and succeeding portion of said movement move said tip into contact with a work piece which has been clamped by said first portion of said movement and upon a third and final portion of said movement operate said switch to close said circuit and upon a first portion of movement in an opposite direction break said circuit and upon a succeeding portion of said movement move said movable member of said clamp away from said fixed member thereby opening said clamp and retracting said tip.

40. In a thermal metal-joining tool, an openable clamp, an electrode tip separate from said clamp and movable in respect thereto, a mount for said tip and said clamp, a work circuit including said clamp and said tip, a switch for said circuit, and control means for operatively interconnecting said clamp tip and switch and including instrumentalities for first closing said clamp, second moving said tip into a work position and relation with a work piece held by said clamp, third operating said switch to open said circuit, fourth operating said switch to open said circuit, fifth moving said electrode away from its work position, and sixth opening said clamp.

41. In a thermal metal-joining tool, a support, means for holding a work piece in operative position upon said support, said holding means including a fixed and a movable member, a switch, a circuit including one member of said holding means and said switch, an actuating member separate from said switch, and sequential linkage between said actuating member and said movable member of said holding means and said switch, said sequential linkage comprising a first component which first operates said holding means to hold said piece in operative position and a second and separate component which thereafter operates said switch to close said circuit.

42. In a hand thermal metal-joining tool, a butt, a barrel one end of which is attached to said butt and extends therefrom, the end of said barrel relatively distant from said butt having a heat resisting cylindrical end formed with a circumferential groove therein, a clamp, said clamp comprising two stirrups, each of said stirrups being of bifurcated or horse-shoe shape and one thereof being readily removable, a resilient supporting member extending from said removable stirrup in a direction normal to the plane of said horse-shoe, and then being formed into a spring clip in loop form normal to the axis of said extension and parallel to the plane of said horse-shoe and positioned and adapted detachably to engage and be supported by said annular depression in said tip, means for moving said other or first stirrup so that it engages and holds a work piece disposed between said stirrups, and an electrode tip, said electrode tip being mounted within said barrel for movement along its longitudinal axis through said cylindrical end piece and into operative relation with the portion of the work piece between the open portions of said stirrups between the bifurcations.

43. In combination, a thermal metal-joining tool, a main support, actuating means mounted adjacent one end of said main support, an operable clamp, a detachable support for said clamp, said main and said detachable supports having cooperating formations by which said detachable support may be readily attached to and removed from said main support, and operating connections between said clamp and said actuating means, said operating connections including motion-transmitting instrumentalities connected to said actuating means and mounted upon said main support, motion-receiving instrumentalities connected to said clamp and mounted upon said detachable support, and connective instrumentalities disposed in part upon said motion transmitting instrumentalities and in part upon said motion receiving instrumentalities and automatically operable to connect said motion-transmitting and motion-receiving instrumentalities upon the positioning of said detachable support upon said main support.

44. In a hand metal-joining tool, a butt, a first barrel extending forwardly from said butt and fixedly mounted thereon, an actuating member mounted upon said butt, a first and motion-transmitting linkage extending forwardly from said actuating member, a second barrel attachable to and removable from said first barrel at the forward end thereof, the forward end of said first barrel and the rearward end of said second barrel having cooperating formations by which said second barrel can be readily attached to and detached from said first barrel, a clamp mounted upon the forward end of said second barrel, said clamp having a movable work-holding member, a second and motion-receiving linkage connected to said movable member of said clamp and extending backwardly therefrom, and connective formations mounted in part upon the forward end of said first linkage and the rearward end of said second linkage and so disposed that when said second barrel is attached to said first barrel said connective formations automatically unite said linkages whereby said movable member of said clamp can be controlled by said actuating member upon said butt.

45. In a hand metal-joining tool, a butt, a first barrel extending forwardly from said butt and fixedly mounted thereon, actuating means mounted upon said butt, a first and motion-transmitting linkage extending forwardly from said actuating means, a second barrel attachable to and removable from said first barrel at the forward end thereof, the forward end of said first barrel and the rearward end of said second barrel having cooperating formations by which said second barrel can be readily attached to and detached from said first barrel, a clamp mounted upon the forward end of said second barrel, said clamp having a movable work-holding member, a movable electrode mounted upon the forward end of said second barrel, a second and motion-receiving linkage connected to said movable member of said clamp and to said electrode and extending backwardly therefrom, and connective formations mounted in part upon the forward end of said first linkage and the rearward end of said second linkage and so disposed that when said second barrel is attached to said first barrel said connective formations unite said linkage automatically whereby said movable member of said clamp and said electrode can be controlled by said actuating means upon said butt.

46. In a metal-joining tool, a support, a first barrel extending forwardly from said butt and fixedly mounted thereon, an actuating member mounted upon said support, a first and motion-transmitting connection extending forwardly along the longitudinal axis of said barrel, linkage between said first connection and said actuating member, a second connection spaced from said first connection extending forwardly along the longitudinal axis of said barrel generally parallel to said first connection, linkage between said actuating member and said second connection, a second barrel attachable to said first barrel at the forward end thereof, the forward end of said first barrel and the rearward end of said second barrel having cooperating formations by which said second barrel can be readily attached to and detached from said first barrel, a clamp mounted upon the forward end of said second barrel, said clamp having a movable work-holding member, a movable electrode mounted on the forward end of said second barrel, a third and motion-receiving connection attached to said movable member of said clamp and extending backwardly therefrom, a fourth and motion-receiving connection attached to said movable electrode and extending backwardly therefrom, and connective formations mounted in part upon the front ends of said first and second connections and said rear ends of said third and fourth connections and each so disposed and formed that when said second barrel is moved into contact with said first barrel two opposed formations join and when said barrel is rotated upon the axis of the connections attached to said formation said remaining connections join whereby said second barrel is attached to said first barrel and said connections unite automatically so said movable member of said clamp and said electrode can be controlled by said actuating member upon said support.

47. In a hand thermal metal-joining tool, a rigid butt, a rigid barrel supported by and extending forwardly from said butt, a flexible nose supported by said forward end of said barrel and adapted to be bent into a plurality of different work positions, an operable clamp supported upon the end of said flexible nose relatively remote from said barrel and movable to engage a work piece, said clamp including at least one work-engaging element which is bodily movable, an actuating member upon said butt, and operating linkage extending from said actuating member through said barrel and flexible nose to said clamp, the part of said linkage within said flexible nose being flexible, for moving said work-engaging element of said clamp by movement of said actuating member irrespective of the position into which said flexible nose may have been bent.

48. In a thermal metal-joining tool, a rigid mount, a flexible nose supported by said mount and adapted to be bent into a plurality of different work positions, a heat-resisting block including an opening upon an axis parallel to the longitudinal axis of the tool supported upon the end of said flexible nose relatively remote from said mount, an electrode tip movable between an inoperative position at last partially housed within said opening and an operative position therewithout wherein it engages a work piece, an actuating control member upon said mount and movable between corresponding inoperative and operative positions, and an operating linkage extending from said tip through said nose to said actuating member for moving said tip by operation of said actuating member alternatively between said inoperative and operative positions irrespective of the position into which said flexible nose may have been bent, the portion of said linkage within said nose being flexible.

49. In a hand thermal metal-joining tool, a rigid butt, a rigid barrel supported by and extending forwardly from said butt, a flexible nose supported by the forward end of said barrel and adapted to be bent into a plurality of different work positions, a movable electrode tip supported upon the forward end of said flexible nose and movable to engage a work piece, an actuating member upon said butt, a thrust rod movable within said barrel along the longitudinal axis thereof, a connection between said thrust rod and said actuating member, and flexible linkage extending within said flexible nose from the forward end of said thrust rod to said movable tip for operating said movable tip by movement of said actuating member irrespective of the position into which said nose may have been bent.

50. In a thermal metal-joining tool, a rigid support, a flexible nose mounted upon said support, an actuating member upon said support, an operable clamp mounted upon the end of said flexible nose relatively remote from said support and movable to engage a work piece, an electrode tip mounted upon said end of said nose and movable in relation to a work piece engaged by said clamp, a flexible motion-transmitting connection between said clamp and said actuating member, a flexible motion-transmitting connection between said electrode tip and said actuating member, and an electrical circuit including said electrode tip and said clamp which includes a flexible electrically conducting connection extending between said clamp and said tip respectively and said support, all of said flexible connections being adapted to be operative irrespective of the position into which said flexible nose has been bent.

51. In an extensible metal-joining tool, a support, a first barrel extending forwardly therefrom and fixedly mounted thereon, an actuating member mounted on said support, a first thrust rod extending forwardly along said barrel to a point adjacent the forward end of said first barrel, therefrom along said barrel, linkage between said actuating member and said first thrust rod for operating said first thrust rod by the movement of said actuating member, a first latching formation upon the forward end of said thrust rod, a second barrel, a movable member of a clamp disposed in the forward end of said second barrel, a second thrust rod extending rearwardly from said movable member of a clamp to a point adjacent the rearward end of said second barrel, and a second latching formation upon the rearward end of said second thrust rod formed and disposed to cooperate with said latching formation disposed on the forward end of said first thrust rod when said barrels are placed together, whereby said movable member of a clamp upon the forward end of said second barrel can be operated by said actuating member upon said support to which said first barrel is fixedly attached.

52. In combination, in a thermal metal-joining tool; a support, and actuating means mounted upon said support and including connections extending to one end thereof; a nose separable from said support and including an operable clamp and a movable electrode independent of said clamp and supported by said nose at one end thereof; and means for detachably joining said nose and said support adjacent the end thereof relatively distant from that which is adapted to be joined to said support, said joining means including instrumentalities for operatively attaching said clamp and said electrode to said connections which extend from said actuating means whereby said clamp and said electrode may be operated by said actuating means when said nose is joined to said barrel.

53. In a thermal metal-joining tool, a support, a movable electrode mounted upon said support, an operable clamp for holding a work piece in relation to said movable electrode mounted upon said support adjacent said electrode, means mounted upon said support for operating said clamp, a circuit including said electrode and said clamp, a switch for said circuit, a connection between said operating means and said switch for operating said switch in timed relation to the movement of said electrode and the operation of said clamp, and a switch independent of said first mentioned switch for opening said circuit independently of the operation of said first mentioned switch by said operating means.

54. In a hand thermal metal-joining tool, a butt, a barrel one end of which is attached to said butt extending therefrom, a clamp disposed upon said barrel adjacent the end thereof relatively remote from said butt, said clamp comprising a relatively fixed member and a member movable relatively thereto, an electrode tip separate from said clamp and movable from within said barrel to a position therewithout wherein it engages a work piece held by said clamp, a trigger mounted upon said butt for operating said movable member of said clamp, a circuit including said tip and said clamp, a switch for said circuit, a connection between said trigger and said switch for operating said switch in timed relation to the movement of said electrode tip and the operation of said clamp, and a switch independent of said first mentioned switch and mounted upon said grip for opening said circuit independently of the operation of said first mentioned switch by said trigger.

55. In a thermal metal-joining tool, a support, a movable electrode mounted upon one end of said support, means upon said support for clamping a work piece for engagement by said movable electrode, a circuit including said electrode and said holding means, a normally open switch for said circuit, means mounted upon said support for moving said electrode to and from operative relation to a work piece, linkage between said operating means and said normally open switch for closing said switch in timed relation to the movement of said electrode toward said work piece and for opening it in timed relation to its movement from said work piece, and a normally closed switch independent of said first mentioned switch operable for opening said circuit independently of the operation of said first mentioned switch by said operating means.

56. In a hand metal-joining tool, a butt, a barrel an end of which is attached to said butt and extends therefrom, work-holding means in the forward end of said barrel opposite that which is attached to said grip for holding a work piece in work position and applying an electrical current thereto, said means including two movable members and one fixed member disposable at said end of said barrel in cooperative relation to each other and the work piece, operating connections for each of said movable members extending backwardly through said barrel along the longitudinal axis thereof generally parallel to each other, actuating means upon said butt, linkage between said actuating means and said operating connections for moving said movable members to work position upon the operation of said actuating means, a circuit including two of said two members, and instrumentalities associated with and operated by said actuating means for rendering said circuit active concomitantly with the movement of said two movable members to work position.

HERBERT COUCHMAN McKAY.

REFERENCES CITED

The following references are of record in the file of this patent:

UNITED STATES PATENTS

| Number | Name | Date |
|---|---|---|
| 818,361 | Eastwood | Apr. 17, 1906 |
| 960,070 | Brown | May 31, 1910 |
| 1,630,990 | Wagg | May 31, 1927 |
| 1,659,911 | Fay | Feb. 21, 1928 |
| 1,733,812 | MacRae | Oct. 29, 1929 |
| 1,928,517 | Varner | Sept. 26, 1933 |
| 1,928,522 | Amundsen | Sept. 26, 1933 |
| 1,970,941 | Paugh | Aug. 21, 1934 |
| 2,000,318 | Cannon | May 7, 1935 |
| 2,106,439 | Schubert | Jan. 25, 1938 |
| 2,112,068 | Cole | Mar. 22, 1938 |
| 2,141,288 | Bouchard | Dec. 27, 1938 |
| 2,243,365 | Adler | May 27, 1941 |
| 2,491,931 | Raker et al. | Dec. 20, 1949 |

FOREIGN PATENTS

| Number | Country | Date |
|---|---|---|
| 553,032 | Great Britain | May 5, 1943 |
| 556,835 | Great Britain | Oct. 25, 1943 |